US008327183B2

(12) United States Patent
Deguchi et al.

(10) Patent No.: US 8,327,183 B2

(45) Date of Patent: Dec. 4, 2012

(54) STORAGE SYSTEM CREATING A RECOVERY REQUEST ENABLING EXECUTION OF A RECOVERY AND COMPRISING A SWITCH THAT DETECTS RECOVERY REQUEST POINT EVENTS

(75) Inventors: Akira Deguchi, Yokohama (JP); Yoshiaki Eguchi, Yokohama (JP); Kenta Ninose, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 440 days.

(21) Appl. No.: 12/500,986

(22) Filed: Jul. 10, 2009

(65) Prior Publication Data

US 2009/0276661 A1 Nov. 5, 2009

Related U.S. Application Data

(63) Continuation of application No. 11/385,860, filed on Mar. 22, 2006, now Pat. No. 7,571,348.

(30) Foreign Application Priority Data

Jan. 31, 2006 (JP) ................................ 2006-021650

(51) Int. Cl.
*G06F 11/00* (2006.01)
*G06F 11/08* (2006.01)

(52) U.S. Cl. ......................... 714/6.12; 714/6.11; 714/15

(58) Field of Classification Search .................. 714/6.2, 714/6.21, 6.23, 6.31, 4.1, 6.11, 4.11, 4.12, 714/4.21, 4.3, 4.4

See application file for complete search history.

(56) References Cited

U.S. PATENT DOCUMENTS

| | | | | |
|---|---|---|---|---|
| 5,799,141 | A * | 8/1998 | Galipeau et al. | 714/13 |
| 7,519,858 | B2 * | 4/2009 | Korlepara | 714/15 |
| 7,873,860 | B2 | 1/2011 | Kaiya et al. | |
| 2004/0193945 | A1 | 9/2004 | Eguchi et al. | |
| 2004/0220971 | A1 * | 11/2004 | Kaushik et al. | 707/200 |
| 2004/0268067 | A1 | 12/2004 | Yamagami | |
| 2005/0005187 | A1 | 1/2005 | Shah | |
| 2005/0015416 | A1 | 1/2005 | Yamagami | |
| 2005/0022213 | A1 | 1/2005 | Yamagami | |
| 2005/0097289 | A1 * | 5/2005 | Burton et al. | 711/162 |
| 2005/0172166 | A1 | 8/2005 | Eguchi et al. | |
| 2005/0210211 | A1 | 9/2005 | Kodama | |
| 2005/0216536 | A1 * | 9/2005 | Stager et al. | 707/204 |
| 2006/0218444 | A1 | 9/2006 | Yoshida et al. | |
| 2006/0259810 | A1 * | 11/2006 | Hosoya et al. | 714/4 |

FOREIGN PATENT DOCUMENTS

| | | |
|---|---|---|
| JP | 2004-252686 | 9/2004 |
| JP | 2005-018738 | 1/2005 |

* cited by examiner

*Primary Examiner* — Joseph Schell

(74) *Attorney, Agent, or Firm* — Antonelli, Terry, Stout & Kraus, LLP.

(57) ABSTRACT

A switch connected to a network system including a computer and a storage apparatus: controlling read/write request from the computer to the storage apparatus and controlling to store journal data in the storage apparatus; wherein the storage apparatus includes a first storage area for storing data to be used by the computer and a second storage area for storing journal data including write data and first update log information corresponding to the write data when there is a write request from the computer for writing data in the first storage area; wherein when the switch detects an event of status change related to the network system, the switch marks a first point of time corresponding to the event as a recovery request point, and creates second update log information corresponding to the recovery request point.

8 Claims, 21 Drawing Sheets

| RPID | SEQ# |
|---|---|
| 1 | 1 |
| 2 | 50 |
| 3 | 100 |
| 4 | 200 |
| ... | ... |

| RPID | ACQUIRED TIME | VOLUME NUMBER | TYPE | EVENT |
|---|---|---|---|---|
| 1 | 2005/10/03 | VOLUME 1 | USER DESIGNATION | — |
| 2 | 2005/10/04 | VOLUME 2 | MANAGEMENT SOFTWARE AUTOMATIC ACQUISITION | ADMINISTRATOR MODE LOGIN |
| 3 | 2005/10/05 | VOLUME 1 | MANAGEMENT SOFTWARE AUTOMATIC ACQUISITION | APPLICATION ERROR |
| 4 | 2005/10/06 | VOLUME 2 | USER DESIGNATION | — |

| RPID | ACQUIRED TIME | VOLUME NUMBER | SEQ# | EVENT |
|---|---|---|---|---|
| 1 | 2005/10/03 | VOLUME 1 | 1 | HOST DESIGNATION |
| 2 | 2005/10/03 | VOLUME 1 | 30 | VOLUME OFFLINE ENABLED |
| 3 | 2005/10/04 | VOLUME 1 | 50 | HOST DESIGNATION |
| 4 | 2005/10/04 | VOLUME 1 | 60 | iSCSI LOGOFF |
| 5 | 2005/10/05 | VOLUME 3 | 100 | HOST DESIGNATION |
| 6 | 2005/10/05 | VOLUME 2 | 120 | SINGLE FAILURE |
| 7 | 2005/10/06 | VOLUME 4 | 200 | HOST DESIGNATION |
| 8 | 2005/10/06 | VOLUME 2 | 265 | TIMER |

| RPID | SEQ# |
|---|---|
| 1 | 1 |
| 2 | 50 |
| 3 | 100 |
| 4 | 200 |
| ... | ... |

FIG.12B 1201 1101 1102 802 1103 1210

| RPID | ACQUIRED TIME | VOLUME NUMBER | SEQ# | EVENT |
|---|---|---|---|---|
| S1 | 2005/10/03 | VOLUME 1 | 30 | VOLUME OFFLINE ENABLED |
| S2 | 2005/10/04 | VOLUME 1 | 60 | iSCSI LOGOFF |
| S3 | 2005/10/05 | VOLUME 2 | 120 | SINGLE FAILURE |
| S4 | 2005/10/06 | VOLUME 2 | 265 | TIMER |

FIG.12C 1201 1101 1102 802 1103 1220

| RPID | ACQUIRED TIME | VOLUME NUMBER | SEQ# | EVENT |
|---|---|---|---|---|
| 1 | 2005/10/03 | VOLUME 1 | 1 | HOST DESIGNATION |
| S1 | 2005/10/03 | VOLUME 1 | 30 | VOLUME OFFLINE ENABLED |
| 2 | 2005/10/04 | VOLUME 1 | 50 | HOST DESIGNATION |
| S2 | 2005/10/04 | VOLUME 1 | 60 | iSCSI LOGOFF |
| 3 | 2005/10/05 | VOLUME 3 | 100 | HOST DESIGNATION |
| S3 | 2005/10/05 | VOLUME 2 | 120 | SINGLE FAILURE |
| 4 | 2005/10/06 | VOLUME 4 | 200 | HOST DESIGNATION |
| S4 | 2005/10/06 | VOLUME 2 | 265 | TIMER |

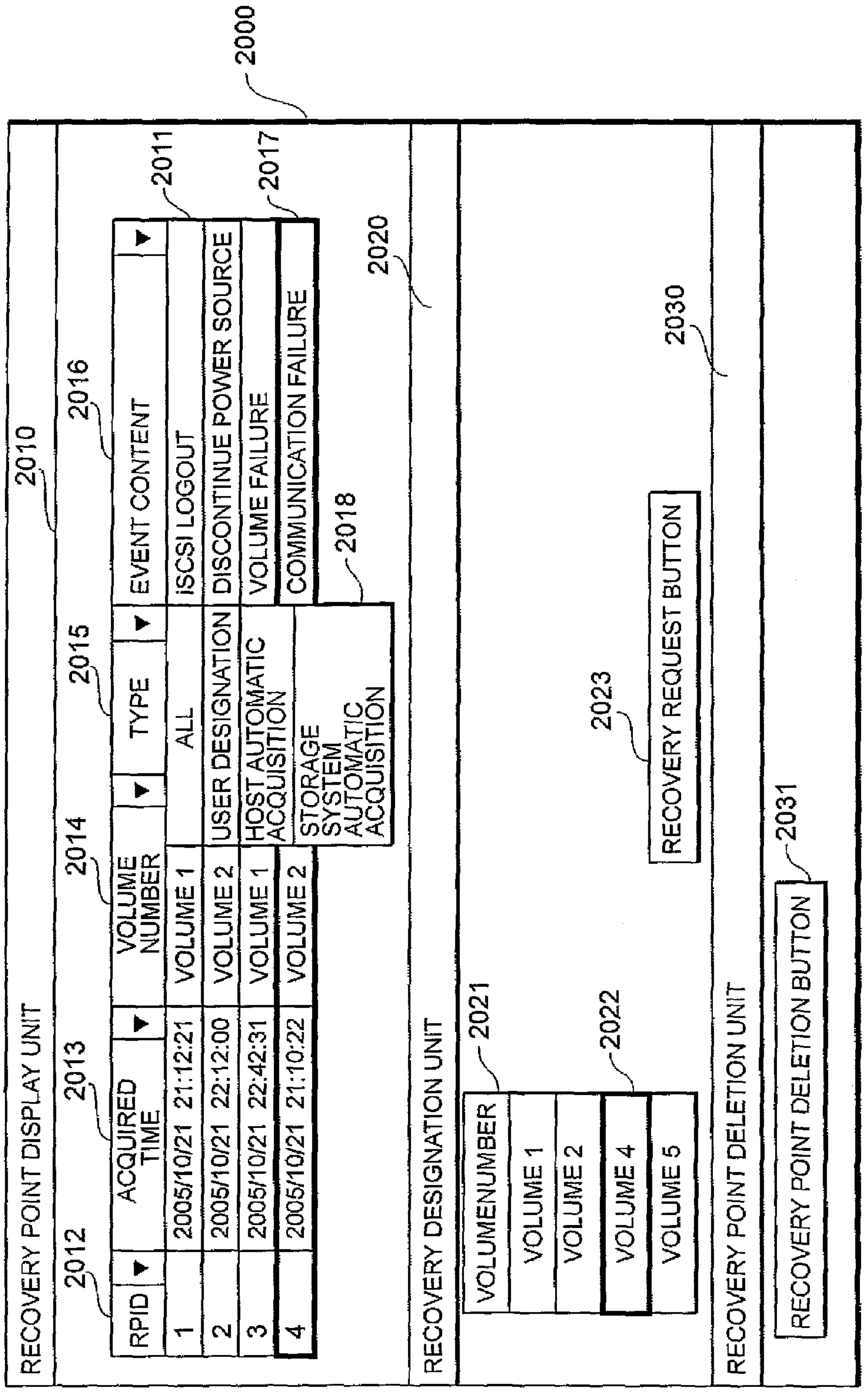

FIG.20

RECOVERY POINT DISPLAY UNIT — 2010

| RPID | ACQUIRED TIME | VOLUME NUMBER | TYPE | EVENT CONTENT |
|---|---|---|---|---|
| 1 | 2005/10/21 21:12:21 | VOLUME 1 | ALL | iSCSI LOGOUT |
| 2 | 2005/10/21 22:12:00 | VOLUME 2 | USER DESIGNATION | DISCONTINUE POWER SOURCE |
| 3 | 2005/10/21 22:42:31 | VOLUME 1 | HOST AUTOMATIC ACQUISITION | VOLUME FAILURE |
| 4 | 2005/10/21 21:10:22 | VOLUME 2 | STORAGE SYSTEM AUTOMATIC ACQUISITION | COMMUNICATION FAILURE |

2000, 2011, 2012, 2013, 2014, 2015, 2016, 2017, 2018

RECOVERY DESIGNATION UNIT — 2020

| VOLUME NUMBER |
|---|
| VOLUME 1 |
| VOLUME 2 |
| **VOLUME 4** |
| VOLUME 5 |

2021, 2022, 2023

[ RECOVERY REQUEST BUTTON ] — 2030

RECOVERY POINT DELETION UNIT

[ RECOVERY POINT DELETION BUTTON ] — 2031

| RPID | ACQUIRED TIME | VOLUME NUMBER | SEQ# | EVENT | DATA CORRUPTION PROBABILITY STATUS INFORMATION |
|---|---|---|---|---|---|
| 11 | 2005/10/05 | VOLUME 1 | 311 | VOLUME OFFLINE ENABLEMENT | NO |
| 12 | 2005/10/05 | VOLUME 1 | 330 | iSCSI LOGOFF | NO |
| 13 | 2005/10/06 | VOLUME 1 | 350 | CACHE FAILURE | YES |
| 14 | 2005/10/07 | VOLUME3 | 360 | NO I/O OCCURRENCE | YES |
| 15 | 2005/10/07 | VOLUME 1 | 370 | HOST DESIGNATION | YES |
| 16 | 2005/10/09 | VOLUME 2 | 390 | FAILURE | YES |
| 17 | 2005/10/09 | VOLUME 4 | 400 | HOST DESIGNATION | YES |
| 18 | 2005/10/09 | VOLUME 2 | 465 | TIMER | YES |

2400

STORAGE SYSTEM CREATING A RECOVERY REQUEST ENABLING EXECUTION OF A RECOVERY AND COMPRISING A SWITCH THAT DETECTS RECOVERY REQUEST POINT EVENTS

CROSS-REFERENCES TO RELATED APPLICATIONS

This is a continuation of U.S. application Ser. No. 11/385,860, filed Mar. 22, 2006 now U.S. Pat. No. 7,571,348. This application relates to and claims priority from Japanese Patent Application No. 2006-021650, filed on Jan. 31, 2006. The entirety of the contents and subject matter of all of the above is incorporated herein by reference.

BACKGROUND

The present invention relates to a storage system that performs backup and recovery of data.

A storage system for storing data of an enterprise information system has been undertaking the role of protecting such data. In response to needs of data protection and the like, in the field of storage systems, a snapshot function, journal function and so on have been proposed for acquiring the replication as the copied data without stopping the enterprise information system, and, when a disaster or operational error arises, instantaneously restoring the data from its replication, or recreating the operational status at a certain time in the past (this processing is hereinafter referred to as "recovery") have been proposed.

The snapshot function is a function for the storage system to create a replication by copying data of a storage area at such time to another storage area upon receiving a snapshot command from a computer. As a result of periodically executing the snapshot function, it is possible to intermittently acquire the replication of data. When using the snapshot function, a user is able to perform recovery at a point when a snapshot was acquired.

The journal function is a function for the storage system to create and store a journal formed from control information on writing and write data upon receiving a write request from a computer. Japanese Patent Laid-Open Publication No. 2005-18738 discloses recovery processing to be executed at a point other than the point a snapshot was created by writing write data contained in a journal in a snapshot acquired with the snapshot function. Like this, by simultaneously using the journal function and snapshot function, it is possible to perform recovery in numerous points from few snapshots.

SUMMARY

With the technology disclosed in Japanese Patent Laid-Open Publication No. 2005-18738, it is not possible to create a point enabling the execution of recovery with a phenomenon (hereinafter referred to as an "event") such as a status change of control information regarding the storage system or data in the storage area, which cannot be detected by the computer using such storage area in the data storage system, as an opportunity for such execution of recovery. Thus, if data immediately before or immediately after the event detected by the storage system is important to the user, such user will not be able to execute recovery at such point.

Thus, an object of the present invention is to provide a storage system including a first storage area storing data to be used by a computer (hereinafter referred to as a "host"), and a second storage area for storing updated data and its update log information when there is an update request from the computer to the first storage area. This storage system monitors its own storage system and detects an event, and creates a target point (hereinafter referred to as a "recovery point") and its update log information based on the event.

When the storage system receives a recovery command at a certain recovery point, it recovers data of the first storage area at the time of recovery point by writing, in a replication storage area at a certain point of the first storage area, update data up to the recovery point among the update data stored in the second storage area. The created storage area will become the storage area in which data of the first storage area at this recovery point was recovered.

Further, the storage system extracts and deletes an arbitrary recovery point among the recovery points.

It is possible to create a recovery point taking the event detected by the storage system as an opportunity to perform recovery.

DESCRIPTION OF DRAWINGS

FIG. 8 is a diagram showing an example of a recovery point management table managed by the storage system;

FIG. 9 is a diagram showing an example of a recovery point management table managed by the host;

FIG. 11 is a diagram showing another example of a recovery point management table managed by the storage system;

FIG. 12A to FIG. 12C are diagrams showing another example of a recovery point management table managed by the storage system;

FIG. 20 is a diagram showing an example of a screen of a recovery point display unit, recovery designation unit and recovery point deletion designation unit of the host;

FIG. 24 is a diagram showing an example of a recovery point management table managed by the storage system in the fifth embodiment.

DETAILED DESCRIPTION

Embodiments of the present invention are now explained in order from the first embodiment to the fifth embodiment. Incidentally, the embodiments described below are merely examples, and the present invention shall not be in any way limited thereby.

First Embodiment

The first embodiment is now explained with reference to FIG. 1 to FIG. 20.

Foremost, the system configuration is explained with reference to FIG. 1 and FIG. 2, and then the overall description of this embodiment is explained with reference to FIG. 3. Next, the snapshot function and journal function, which are software functions, used in this embodiment are explained with reference to FIG. 4 and FIG. 5A-5D. Then, the journal creation processing in reply to a write request from the host is explained with reference to FIG. 6. Thereafter, the recovery point creation processing in reply to a request from the host is explained with reference to FIG. 7 to FIG. 9, and the recovery processing in reply to a request from the user is explained with reference to FIG. 10. Moreover, the recovery point creation processing according to an event detected by the storage system and deletion of recovery points are explained with reference to FIG. 11 to FIG. 20.

Figure 1:
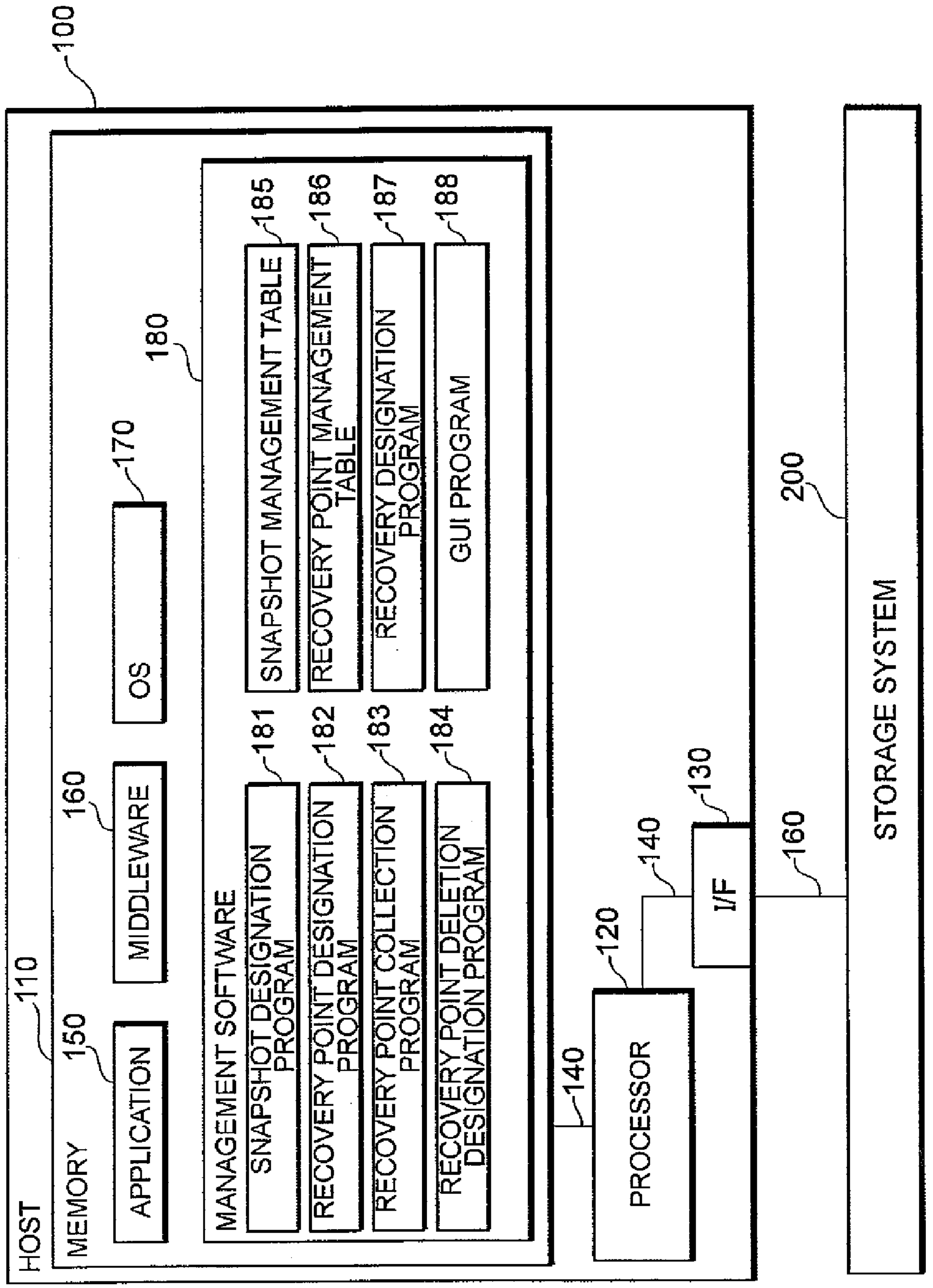
FIG. 1 is a diagram showing an example of an information processing system, and an example of the configuration of a host in the first embodiment.
Figure 2:
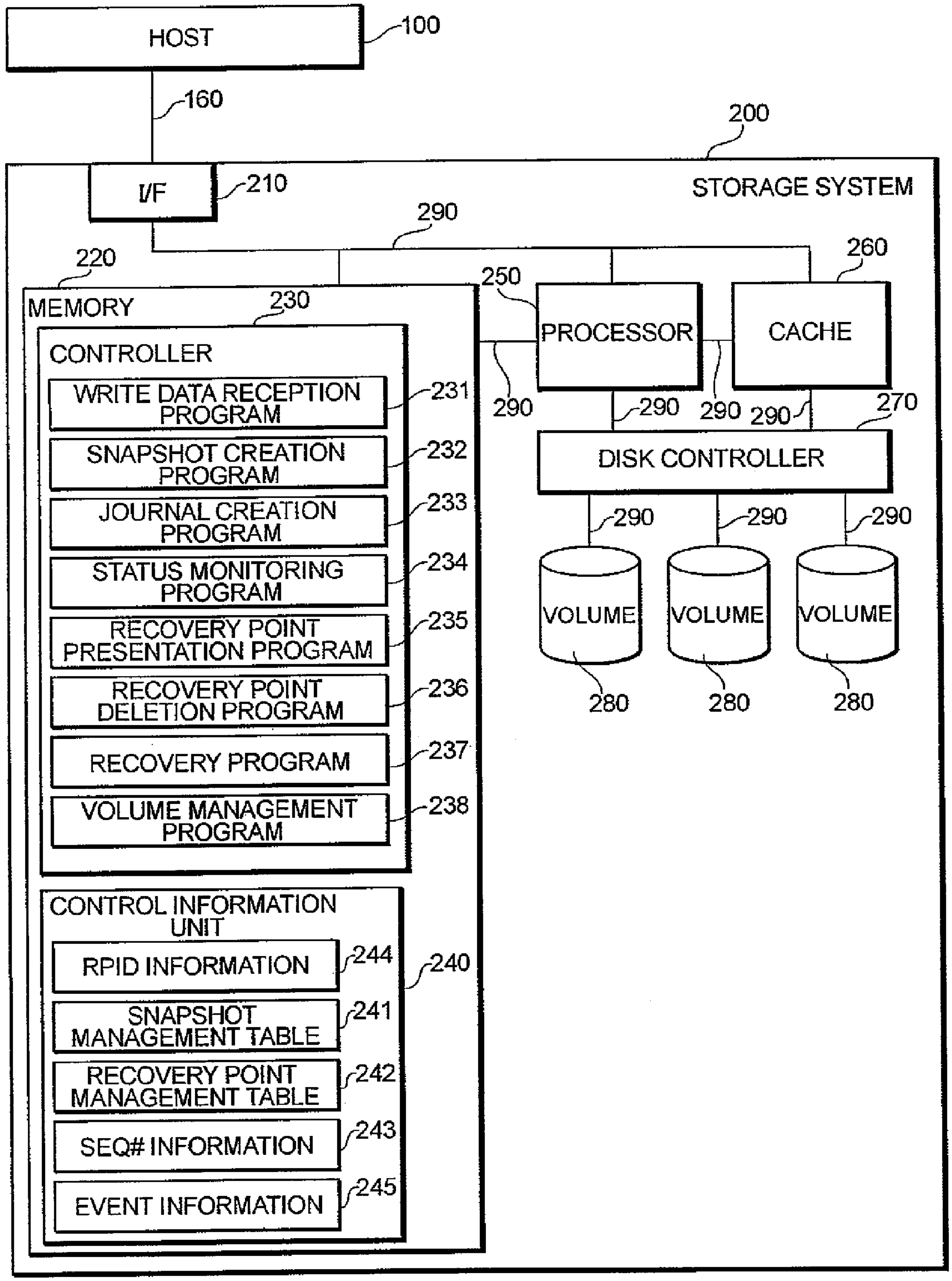
FIG. 2 is a diagram showing an example of the configuration of a storage system.

FIG. 1 and FIG. 2 show an example of the overall configuration of a system pertaining to the present embodiment. This system is configured from a host 100 and a storage system 200 connected via a network 160. In particular, FIG. 1 is a diagram showing the detailed configuration of the host 100, and FIG. 2 is a diagram showing the detailed configuration of the storage system 200.

Foremost, the detailed configuration of the host 100 is explained with reference to FIG. 1. The host 100 is an apparatus for performing business processing by executing software such an application 150 or a database management system (hereinafter referred to as a "DBMS"). And, data to be used in the business processing to be executed by the host 100 is partially or entirely stored in the storage system 200 connected via the network 160.

The host 100 has an interface (hereinafter abbreviated as "I/F") 130, a memory 110, and a processor 120. The I/F 130 is an interface for the host 100 to request the reading or writing of data stored in the storage system 200. The I/F 130 is connected to the processor 120 via a network 140. The host 100 may have a plurality of I/Fs 130. Further, for instance, although FC (Fibre Channel) or iSCSI may be used as the I/F 130, any interface satisfying the foregoing usage may be used.

The memory 110 stores software such as an OS (Operating System) 170, middleware 160, application 150, and management software 180. The foregoing software is executed by the processor 120 connected to the memory via the network 140 reading and executing such software. Programs and management information for performing the backup and recovery of data in the present embodiment are stored in the management software 180. Details regarding the operation of programs contained in the management software 180 will be described later.

Next, the detailed configuration of the storage system 200 is explained with reference to FIG. 2. The storage system 200, as described above, is an apparatus for storing data to be used in the business processing to be executed by the host 100. The storage system 200 is broadly configured from an I/F 210, a cache 260, a memory 220, a processor 250, a disk controller 270, and a volume 280.

The I/F 210 is an interface for receiving a write or read request from the host 100. The I/F 210 is connected to the memory 220, processor 250 and cache 260 via a network 290. The storage system 200 may have a plurality of I/Fs 210. Further, for instance, although FC (Fibre Channel) or iSCSI may be used as the I/F 210, any interface satisfying the foregoing usage may be used.

The volume 280 stores data to be used by the host 100. The volume 280 may be a physical storage such as a magnetic disk device, magnetic memory or optical disk, or may be a logical storage area formed from one or more physical storages based on a method such as RAID (Redundant Arrays of Inexpensive Disks). The volume 280 is connected to the disk controller 270 via the network 290.

Write and read processing to the volume 280 is performed by the processor 250 issuing a read or write command to the disk controller 270 connected via the network 290.

The cache 260 is a high-speed storage medium in comparison to the volume 280. By storing frequently used data to be stored in the volume 280 in the cache 260, it is possible to seek the speed-up of read or write processing requested from the host 100 in comparison to cases of constantly storing all data in the volume 280. Further, the cache 260 is connected to the I/F 210, processor 250 and disk controller 270 via the network 290.

The memory 220 stores programs of the controller 230 and control information unit 240. Programs for realizing the functions provided by the storage system 200 are recorded in the controller 230. And, management information to be used by these programs are recorded in the control information unit 240.

The processor 250 processes the programs stored in these memories and management information to be used by the programs by reading them from the memory 220. Details regarding the programs and management information of the controller 230 and control information unit 240 will be described later. Further, the memory 220 is connected to the I/F 210 and processor 250 via the network 290. Incidentally, the processor 250 and cache 260 may be duplicated to avoid the loss of data at the time of failure.

Incidentally, let it be assumed that the storage system 200 has a power source unit (not shown) for supplying power to the memory 220, processor 250, cache 260, I/F 210, disk controller 270 and so on. Further, the foregoing power source unit, memory 220, cache 260, I/F 210, disk controller 270 and the like may have a built-in processor for transmitting and receiving control information, and a memory for storing control information.

Incidentally, memories such as the memories 110, 220 of the host 100 and storage system 200 may be configured from a RAM (Random Access Memory) or the like. Further, processors such as the processors 120, 250 of the host 100 and storage system 200 may be a processing unit configured from a CPU (Central Processing Unit).

Incidentally, the function modules of the controller 230, control information unit and so on may be realized with software as described above, with hardware such as an arbitrary CPU or other LSI (Large Scale Integration), or the combination thereof. Further, the foregoing configuration also applies to the function modules in other configurations such as the management software 180 contained in the host 100.

Next, the snapshot function, journal function, and backup method using recovery points in this embodiment are described in frame format to explain the basic description of this embodiment.

Figure 3:
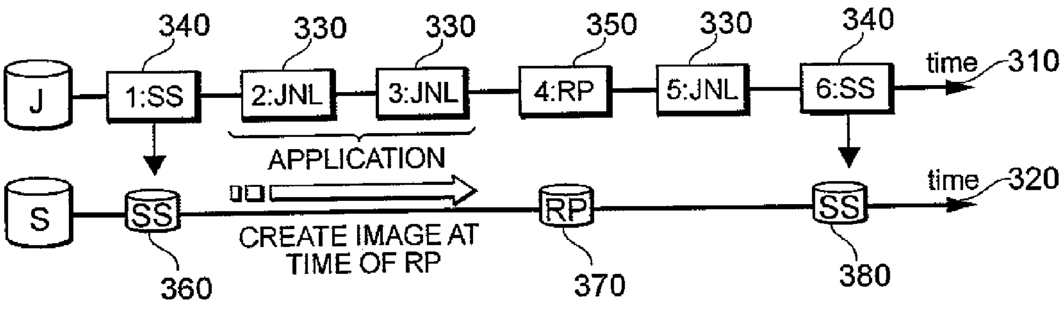
FIG. 3 is a diagram showing the concept of recovery processing using a snapshot and journal.

An arrow 310 in FIG. 3 shows the contents of the volume storing a journal (hereinafter referred to as a "journal volume") in a time series, and an arrow 320 shows the snapshot acquisition status in a time series.

Blocks 330, 340 and 350 indicated on top of the arrow 310 are journals, and one block corresponds to one journal. "JNL" shown in the block 330 implies that it is a journal created in reply to a write request from the host 100 at such time for reading a certain volume. "SS" shown in the block 340 implies that, when a snapshot to a certain volume is acquired at such time, it is a special journal (hereinafter referred to as a "snapshot journal") storing identifying information of such volume as information relating to the snapshot. "RP" shown in the block 350 implies that, when a recovery point to a certain volume is acquired at such time, it is a special journal (hereinafter referred to as a "recovery point journal") for storing identifying information of such volume as information of the recovery point.

Details regarding the information stored in the journal, snapshot journal and recovery point journal will be described later with reference to FIG. 5A-5D.

Further, the numbers shown before "SS", "JNL", "RP" in the respective blocks shown in FIG. 3 represent the value of a sequence number (hereinafter abbreviated as "SEQ#"), which is a sequential number given to the respective journals. The host 100 and storage system 200 are able to uniquely recognize the respective journals with this SEQ#.

Next, volumes 360, 370 and 380 shown on top of the arrow 320 in FIG. 3 are explained. The volumes 360 and 380 respectively signify that a snapshot of a certain volume at that point have been obtained and they are capable of restoring a data image of such volume. In other words, the volume 360 is a volume that is created when a snapshot is acquired in correspondence to a snapshot journal having a SEQ# of 1, the volume 380 is a volume that is created when a snapshot is acquired in correspondence to a snapshot journal having a SEQ# of 6.

And, a volume 370 shown on top of the arrow 320 signifies that a recovery point has been acquire in preparation for recovery processing at that point and is capable of restoring a data image of such volume during recovery processing. In other words, the volume 370 is a volume created when restoring data at such point in correspondence to a recovery point journal having a SEQ# of 4. When a request for recovery processing is received from the user, data of the recovery point is created by sequentially writing write data contained in journals having SEQ# of 2 and 3 in the snapshot volume shown by the volume 360.

Figure 4:
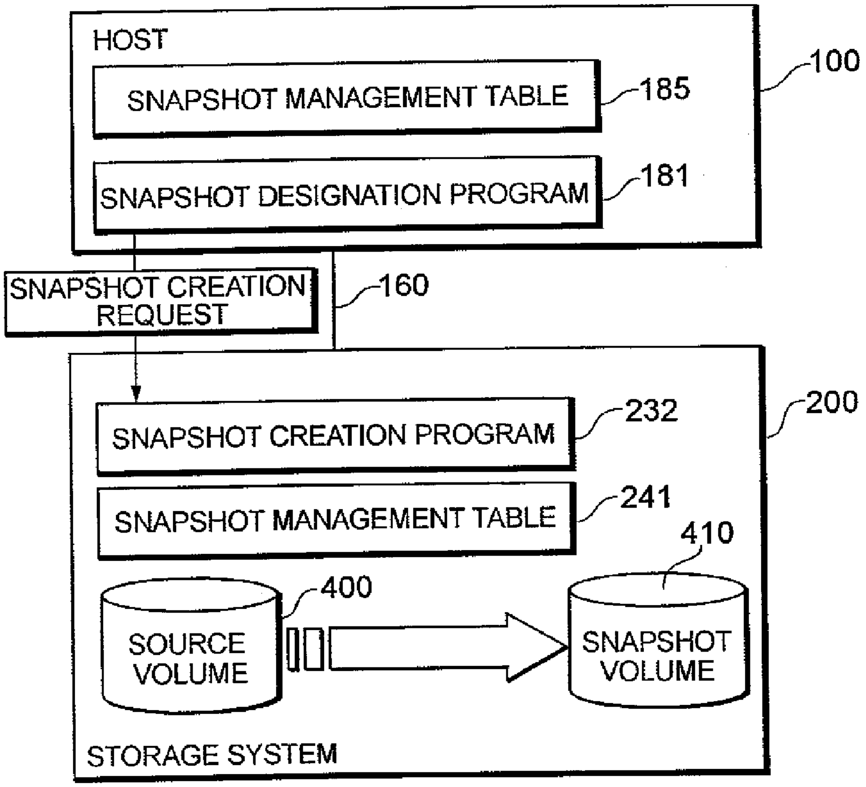
FIG. 4 is a diagram showing the concept of a snapshot function.

Here, details of the snapshot function are explained with reference to FIG. 4. The snapshot function, as described above, is a function for the storage system 200 to copy data contained in the volume 280 (hereinafter referred to as a "source volume") in the storage system 200 to a volume 280 different from source volume (hereinafter referred to as a "snapshot volume") so as to create a replication of the source volume of a certain time.

The operation for creating a snapshot is briefly explained with reference to a conceptual diagram relating to the snapshot creation shown in FIG. 4. The host 100 has a snapshot designation program 181 for making a snapshot creation request to the storage system 200, and a snapshot management table 185 for managing the information of the created snapshot. In addition, the storage system 200 has a snapshot creation program 232 for creating a snapshot and a snapshot management table 241 for managing the information of the created snapshot.

The operation for creating the snapshot is explained. The snapshot designation program 181 of the host 100 issues a snapshot creation request to the snapshot creation program 232 of the storage system 200. Here, the host 100 specifies a source volume 400 and snapshot volume 410 as a destination volume from the volume 280. The snapshot creation program 232 that received the snapshot creation request sequentially reads data from the initial address of the source volume 400 to the end of the source volume 400, and writes this in the snapshot volume 410. When all data up to the end of the volume is copied, the snapshot creation is complete.

Nevertheless, in order to create a snapshot of the volume 280 of a certain time with the foregoing operation, it is necessary to acquire the snapshot upon once stopping the write processing from the host 100 to the source volume 400. A method of avoiding this and creating a snapshot while receiving a write request from the host 100 is now explained. In order to realize this, the storage system 200 has a copied bitmap (not shown). A copied bitmap is information showing, for each address in the source volume 400, whether data stored in such address has been copied to the snapshot volume 410. Here, let it be assumed that copying is complete when the value of the copied bitmap of a certain address is "OFF", and incomplete when the value is "ON".

When the snapshot creation program 232 receives a snapshot creation request, all contents of the copied bitmap are turned "ON". Next, when the snapshot creation program 232 copies data from the source volume 400 to the snapshot volume 410, it changes the value of the copied bitmap to the copied address to "OFF". Moreover, also upon receiving a write request from the host 100, the snapshot creation program 232 refers to the copied bitmap, and copies data of the write address from the source volume 400 at such time to the snapshot volume 410 when the value of the copied bitmap to the write address is "ON", and changes the copied bitmap to "OFF". After this copying is complete, the snapshot creation program 232 writes the write data from the host 100 in the source volume 400.

As a result, it is possible to create a snapshot of the volume 280 at the time the snapshot creation program 232 of the storage system 200 received a snapshot creation request, while receiving a write request from the host 100.

Further, although a snapshot was created based on the snapshot creation request from the host 100 in the foregoing explanation, a snapshot may also be created based on the snapshot creation request from another program in the storage system 200.

Further, the copied bitmap may be held as information of the snapshot volume 410. When creating a plurality of snapshot volumes 410 from a single source volume 400, management of the copied bitmap can be simplified by retaining the copied bitmap in the respective snapshots.

Incidentally, although not shown, the snapshot management tables 185 and 241 of the host 100 and storage system 200 have as attributes a snapshot number as an identification number for uniquely identifying snapshots, a SEQ# (sequence number) of journals as described above, a source volume number for uniquely identifying the source volume 400, a snapshot volume number for identifying the snapshot volume 410, and so on.

Next, details of the journal function are explained. Although only data at a point when a snapshot was created can be recovered with the snapshot function, by simultaneously using the journal function with the snapshot function, it is possible to recover data in numerous points from few snapshots. The outline of realizing this function is described below. When the storage system 200 receives a write request from the host 100, it uses the journal function to create and store a journal from control information (time, write address and so on) relating to the write request and the write data. Then, upon recovering the data, the storage system 200 writes the write data in the journal to the snapshot (this is hereafter expressed as "applying the journal to the snapshot") and thereby recovers data at points other than those when a snapshot was created.

Moreover, for instance, there are cases when the management software 180 of the host 100 detects an error in the application of the host 100, or when the user instructs the host 100 to create a specific recovery point. Cases where the host 100 requests the acquisition of a recovery point to the storage system 200 at a point other than the write request to the storage system 200 from the host 100 are explained (details will be described later with reference to FIG. 7)

Foremost, the host 100 issues a recovery point creation request to the storage system 200. Then, the storage system 200 manages the recovery point based such command, and controls the recovery to such recovery point.

The storage system 200, as described in FIG. 3, gives a sequential number (SEQ#) to a journal corresponding to a write request, a snapshot journal created at a point when a snapshot creation request was received, and a recovery point journal created at a point when a recovery point creation request was received. As a result of the foregoing processing, for example, although a snapshot is only acquired every hour such as at 10:00, 11:00 and so on, if a recovery point is created at 10:30, it is possible to recover data of the volume 280 at 10:30 by applying the journal (journal of the subsequent SEQ#) immediately after the snapshot journal at 10:00 and the journal immediately before the recovery point journal at 10:30 to the snapshot volume acquired at 10:00.

The host 100 and storage system 200 have the following programs and management information for performing recovery with the journal function. The host 100 has a recovery point designation program 182 for issuing a recovery point creation request to the storage system 200, a recovery point management table 186 for managing the created recovery point, and a recovery designation program 187 for requesting the data recovery of a certain recovery point. The storage system 200 has a journal creation program 233 for creating a journal to a write request, a recovery point journal to a recovery point creation request, and a snapshot journal to a snapshot creation request, SEQ# information 243 for managing the sequential number of the journals, a recovery point management table 242 for managing the recovery point created by the storage system 200, a recovery program 237 for executing the recovery processing based on a recovery request from the host 100, and a journal volume as an area for storing the foregoing journals among the volumes 280.

Figure 5A:
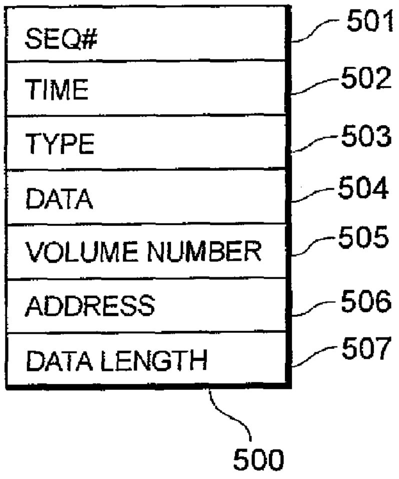
FIG. 5A to FIG. 5D are diagrams showing an example of a journal format.

Next, the journal format is explained with reference to FIG. 5A-5D. As described above, there are three types of journals; namely, a journal to a write request, a snapshot journal to a snapshot creation request, and a recovery point journal to a recovery point creation request, but the format is all the same. FIG. 5A-5D show an example of the journal format. As shown in FIG. 5A, stored as the attributes of a journal 500 are a SEQ#501, time 502, type 503, data 504, volume number 505, address 506, and data length 507.

The SEQ#501 stores a sequence number which is a sequential number given uniquely to the journal corresponding to the write, snapshot journal and recovery point journal.

The time 502 stores, for each journal, time information of when the storage system 200 updated write data corresponding to a write request, time information of when the storage system 200 acquired a snapshot, and time information of when the storage system 200 created a recovery point.

The type 503 stores information for identifying whether the journal is a journal corresponding to the write, snapshot journal or recovery point journal.

The volume number 505 stores, for each journal, volume identifying information of a data volume to be the target of a write request, volume identifying information of a source volume to be the target of snapshot creation, and volume identifying information to the target of recovery point creation.

The data 504, address 506 and data length 507 respectively store, upon creating a journal corresponding to the write request, write data updated based on the write request, address information of write data in the data volume, and the data length of write data. Incidentally, when the type 503 is a snapshot journal or recovery point journal, the data 504, address 506 and data length 507 do not store anything.

The journal format may also be given, in addition to the foregoing attributes, for example, identifying information of a snapshot volume of a copy destination to the snapshot journal.

Figure 5B:
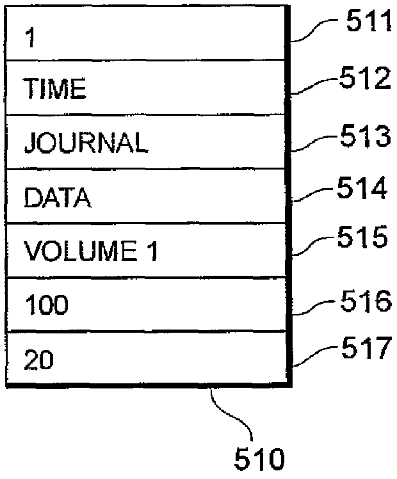
Figure 5C:
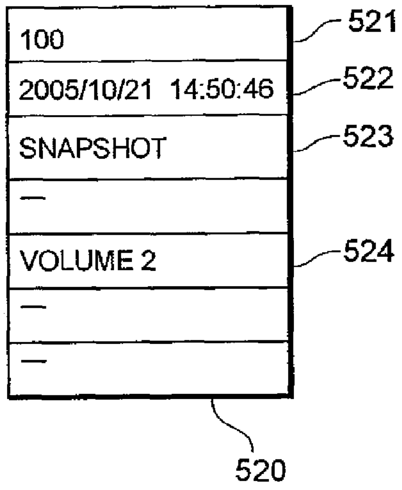
Figure 5D:
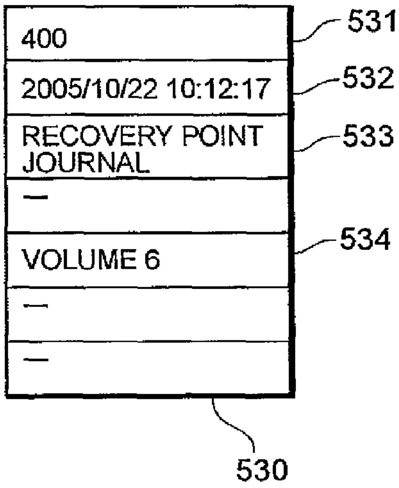

FIGS. 5B, 5C and 5D show specific examples of a journal 510 corresponding to the write, snapshot journal 520, recovery point journal 530. For example, the journal 520 shown in FIG. 5C is a snapshot journal in which the SEQ#501 is 100, and, at the time of 2005 Oct. 21 14:50:46, shows that a snapshot was acquired to the volume 2 in which the volume number 505 is 2.

These journals are created by the journal creation program 233 and stored in a journal volume.

Figure 6:
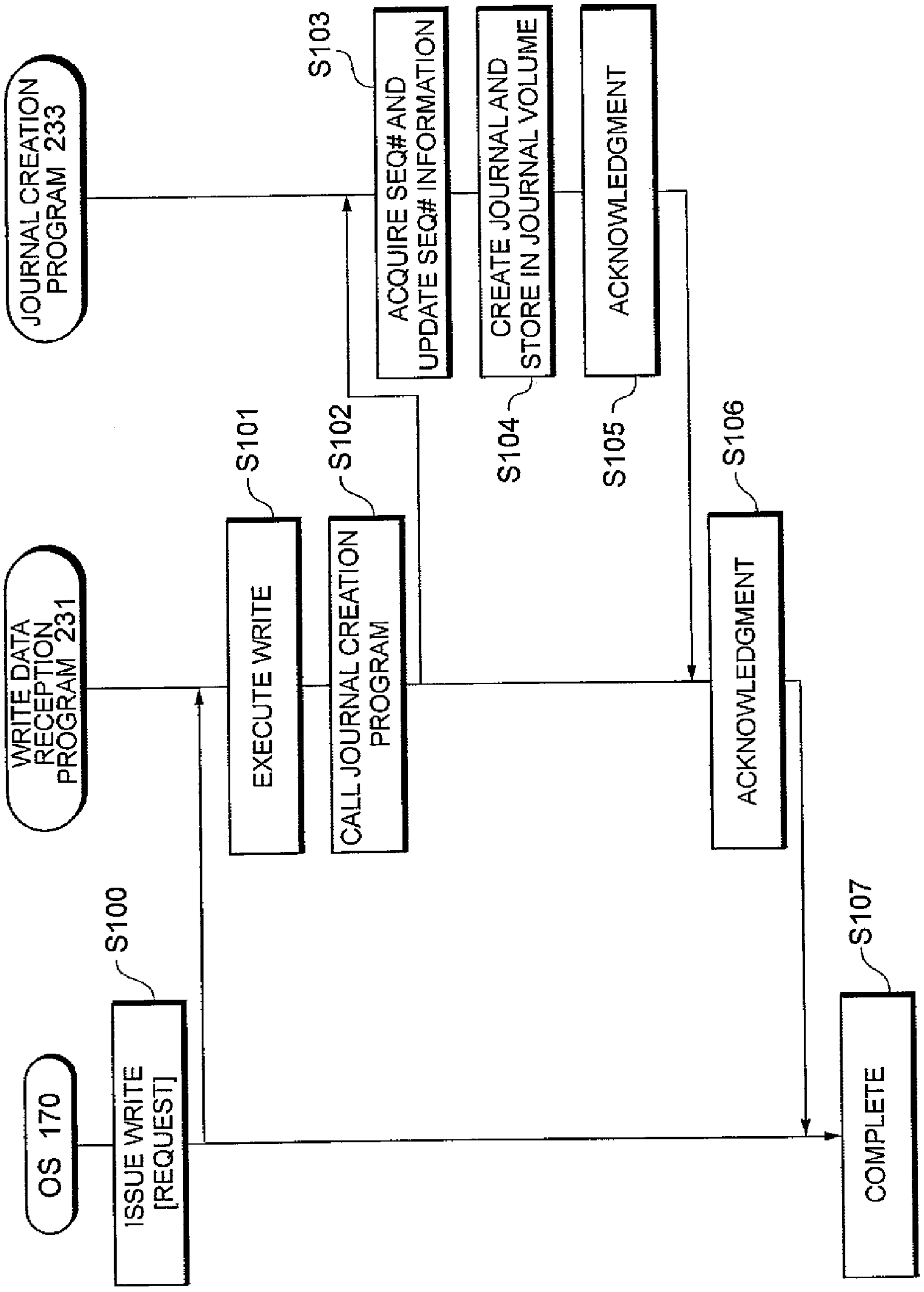
FIG. 6 is a diagram showing an example of journal creation processing at the time of write request.

FIG. 6 shows an example of the processing for the storage system 200 to receive a write request from the host 100 and create a journal. This processing is performed by the processor 120 of the host 100 executing programs such as the OS 170 for issuing a write request in the host 100, and the processor 250 of the storage system 200 executing the write data reception program 231 and journal creation program 233 of the storage system 200.

The OS 170 in the host 100 issues a write request to the storage system 200 (S100). When the write data reception program 231 of the storage system 200 receives this write request, it writes the write data in the volume 280 to be written (S101). Next, the journal creation program 233 is called (S102). The called journal creation program 233 acquires a SEQ# from the SEQ# information 243. Since SEQ# are prepared for creating subsequent journals, the journal creation program 233 updates the SEQ# information 243 by adding 1 to the acquired SEQ# (S103).

Next, the journal creation program 233 creates a journal from the acquired SEQ# and write data, and stores this in the journal volume (S104). Finally, a acknowledgment is notified to the write data reception program 231 as the call source (S105). The write data reception program 231 that received the acknowledgment reports the acknowledgment of writing to the host 100 (S106).

Here, this embodiment can be broadly classified into two cases; namely, a first case where the storage system 200 creates a recovery point journal based on instructions from the host 100, and a second case of the storage system 200 creating a recovery point without any instruction from the host 100.

Foremost, the processing for creating a recovery point journal based on instructions from the host 100 in this embodiment is explained with reference to FIG. 7 to FIG. 9.

Figure 7:
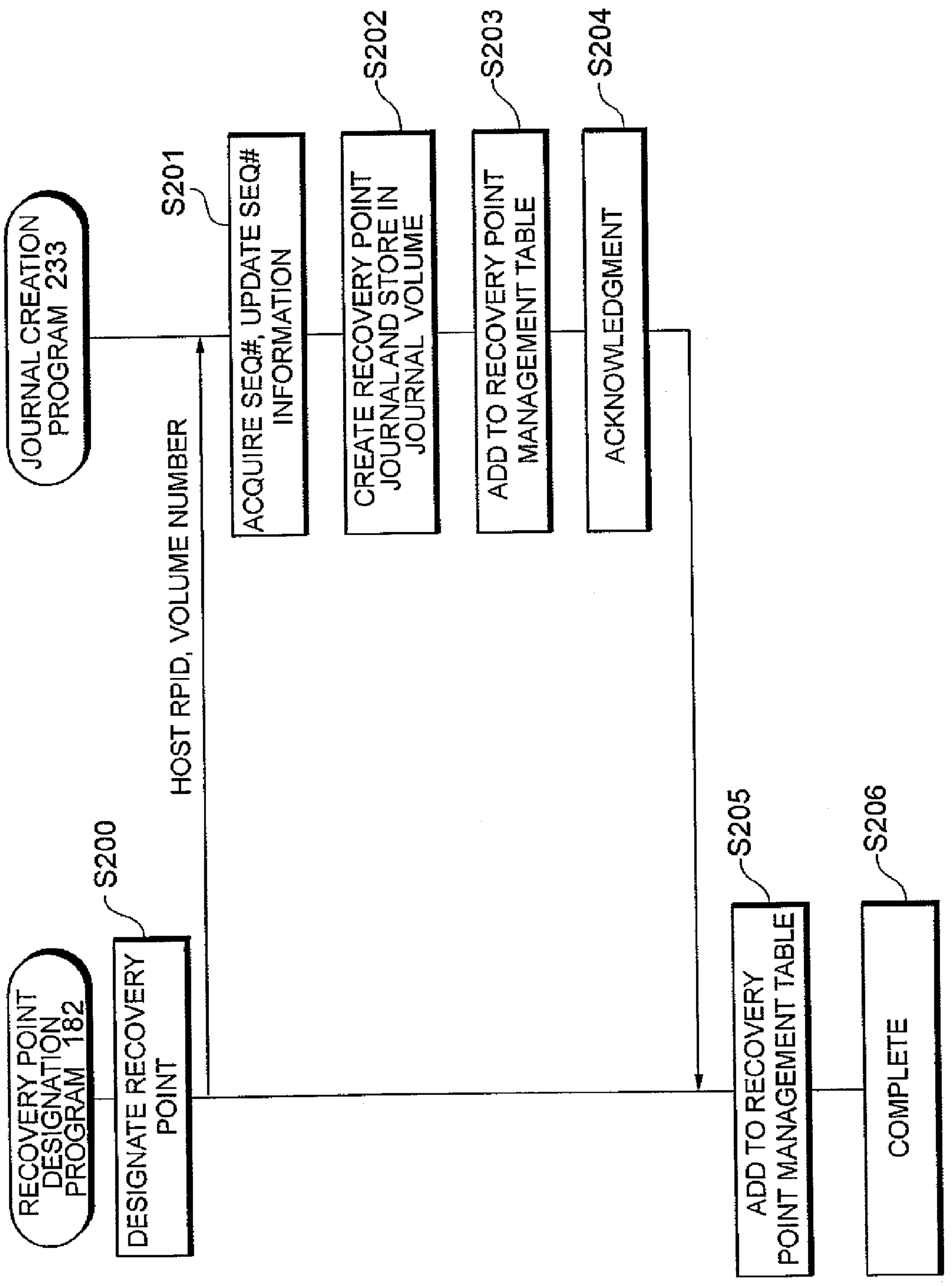
FIG. 7 is a diagram showing an example of recovery point creation processing.

FIG. 7 shows an example of the processing where the storage system 200 receives a recovery point creation request from the host 100 and creates a recovery point journal. This processing is realized by the processor 120 of the host 100 executing the recovery point designation program 182, and the processor 250 of the storage system 200 executing the journal creation program 233.

The recovery point designation program 182 issues a recovery point creation request to the journal creation program 233 (S200). Here, as parameters, a volume number to be the target of recovery point creation, and a recovery point ID (hereinafter abbreviated as "RPID") as the identification number for uniquely identifying the recovery point are delivered to the journal creation program 233.

The journal creation program 233 that received the recovery point creation request acquires a SEQ# from the SEQ# information 243 as with step S103, and updates the SEQ# information 243 for subsequent write requests (S201). Next, the journal creation program 233 creates a recovery point journal containing the acquired SEQ# and stores this in the journal volume (S202). Finally, the journal creation program 233 adds the recovery point information created at step S202 to the recovery point management table 242 (S203), and notifies the recovery point designation program 182 the acknowledgment (S204). At S203, the value to be registered in the recovery point management table 242 of the storage system 200 is the SEQ# allotted at step S202, and RPID received as a parameter from the host.

The recovery point designation program 182 that received the acknowledgment adds the recovery point information to the recovery point management table 186 in the host 100 (S205) and ends this processing (S206).

FIG. 8 shows an example of the recovery point management table 242 managed by the storage system 200. The recovery point management table 242 stores RPID 801 and SEQ#802 as attributes of the recovery point. The RPID 801, as explained with reference to S203 of FIG. 7, stores an identification number of a recovery point received from the host 100. In addition, the SEQ#802 stores SEQ# of the recovery point journals to the recovery point. This SEQ#802 enables the recovery point journals to be identified uniquely.

FIG. 9 shows an example of the recovery point management table 186 managed by the host 100. The recovery point management table 186 stores, as attributes of the recovery point, RPID 901, acquisition time 902, volume number 903, type 904 and event 905. The RPID 901 is a value to be delivered as a parameter by the recovery point designation program 182 at the time of making a recovery point creation request at S200 in FIG. 7. The acquisition time 902 is a value showing the time information of when the host 100 issued the recovery point creation request. The volume number 903 is information showing which volume 280 is the volume 280 to be the target of recovery point creation. The type 904 stores information showing whether the recovery point was automatically acquired by the management software 180, or acquired based on instructions from the user. The event 905 stores information showing which event that occurred to the host was used as the opportunity to issue the recovery point creation request when the management software 180 automatically acquired the recovery point.

Next, recovery processing using the recovery point is explained with reference to FIG. 10.

Figure 10:
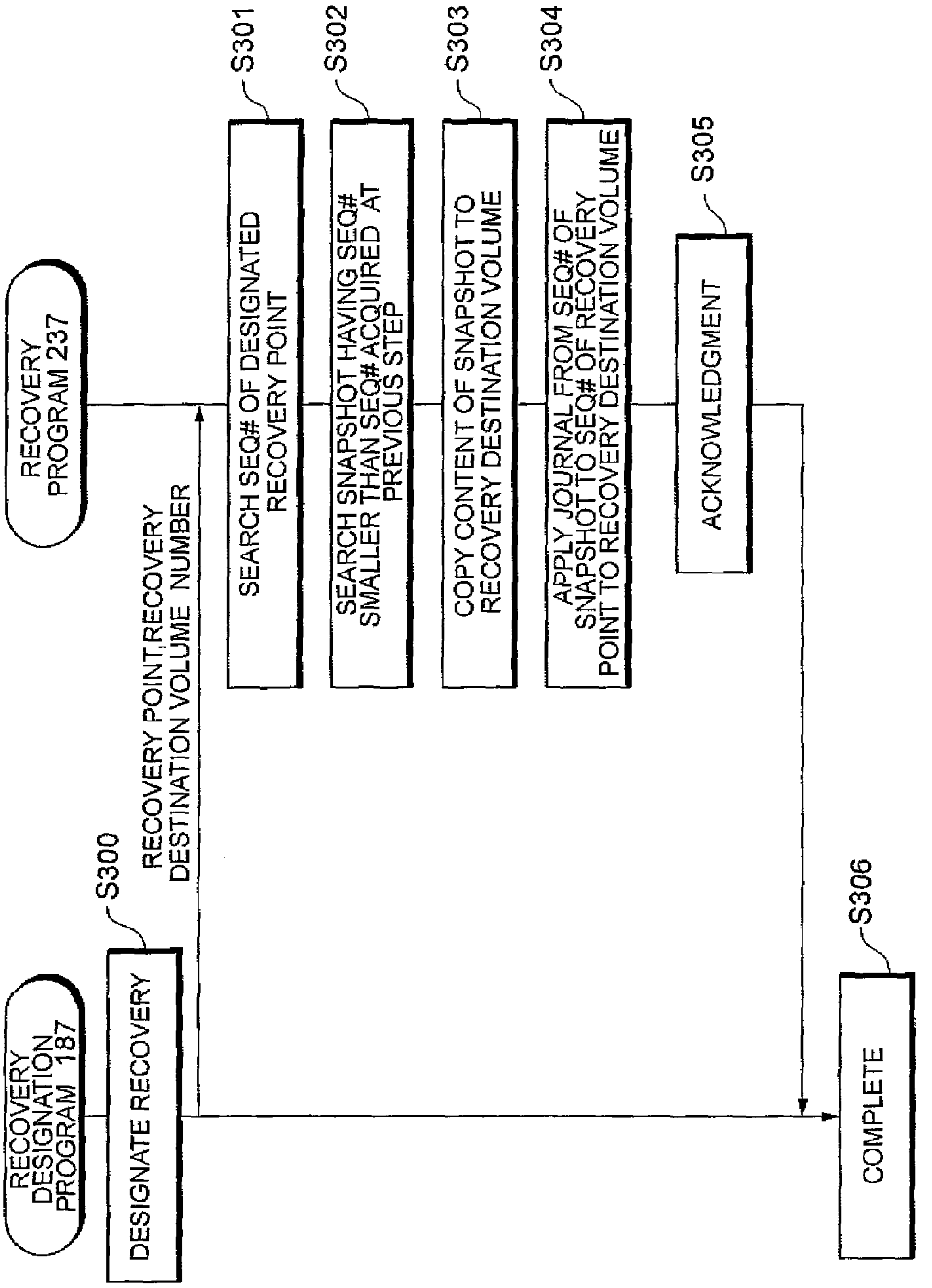
FIG. 10 is a diagram showing an example of recovery processing at a recovery point.

FIG. 10 shows an example of the processing for recovering data of a recovery point designated by the user. This processing is realized by the processor 120 of the host 100 executing the recovery designation program 187, and the processor 250 of the storage system 200 executing the recovery program 237.

The recovery designation program 187 issues the recovery processing command to the recovery program 237 of the storage system 200. Here, the recovery designation program 187 designates the RPID 901 and recovery destination volume number. A recovery destination volume is a volume 280 for storing data to be recovered (S300). The recovery program 237 that received the recovery request searches for the SEQ#802 of the recovery point journal corresponding to the recovery point shown by the designated RPID. This processing is realized by referring to the recovery point management table 242 based on the RPID 901 designated by the host 100, and obtaining the RPID 801 and the value of the SEQ#802 of the recovery point journal of the recovery point corresponding to the RPID 801 (S301).

Next, the recovery program 237 refers to the snapshot management table 241 of the storage system 200, and searches for a snapshot having a SEQ# that is smaller than the value of the SEQ# obtained at the previous step (S302). Then, the recovery program 237 copies the data stored in the snapshot volume corresponding to the snapshot to the recovery destination volume (S303). Finally, the recovery program 237 applies the journals existing between the SEQ# of the snapshot journal detected at step S302 and the SEQ# of the recovery point journal detected at step S301 to the recovery destination volume in the order of the SEQ# (S304), and notifies the acknowledgment to the recovery designation program 187 (S305).

As a result of the foregoing processing, data of a recovery point designated by the user is recovered to the recovery destination volume.

Next, the second case of the storage system 200 creating a recovery point without any instruction from the host 100 in this embodiment is explained with reference to FIG. 11 to FIG. 16. Foremost, the method of allotting recovery points is explained with reference to FIG. 11 and FIG. 12A-12C.

The storage system 200 determines a recovery point identification number (RPID) to allotted to the recovery point to be created without any instruction from the host 100. In order to realize this, the storage system 200 has RPID information 244 in the control information unit 240. The RPID information 244 stores unused RPID in the storage system 200. Further, it is also possible to manage the RPID by simply managing a single number as the RPID information 244, and incrementing the value to be managed by 1 upon allocating the RPID to the recovery point.

As a method of integrally allotting RPID to the host 100 and storage system 200, as shown in FIG. 11, the storage system 200 may allot the RPID from the RPID information 244 to both the recovery point based on instructions from the host 100, and the recovery point to be automatically created by the storage system 200 without any instruction from the host 100.

When issuing the recovery point creation request from the host 100 to the storage system 200, the recovery point designation program 182 is not required to deliver the RPID 901 as a parameter at S200 in FIG. 7. The journal creation program 233 acquires the RPID 801 from the RPID information 244 and allots the same immediately before S201. Finally, when notifying the acknowledgment of recovery point creation at S204 in FIG. 7, the RPID 801 allotted by the journal creation program 233 is notified to the recovery point designation program 182.

FIG. 11 shows an example of the recovery point management table 242 managed by the storage system 200.

The recovery point management table 242 shown in FIG. 11 has, as its attributes, acquisition time 1101, volume number 1102 and event 1103 in addition to the attributes of RPID 801 and SEQ#802 of the recovery point management table 242 shown in FIG. 8.

The acquisition time 1101 stores the time when the recovery point journal was created based an event detected by the storage system 200, or instructions from the host.

The volume number 1102 is information showing which volume 280 is the volume to be the target of recovery point creation.

The event 1103 stores information showing which event that occurred to the storage system 200 was used as the opportunity to create the recovery point. Further, when creating a recovery point based on instructions from the host 100, the event 1103 stores identifying information showing that the creation was based on instructions from the host.

As a result with these management information, the storage system 200 is able to provide information to the host 100 regarding the recovery point of which volume 280 was created when and based on what event in the storage system 200.

Further, in addition to the methods described above, the host 100 and storage system 200 may respectively allot separate RPIDs, differentiate and manage such RPIDs, and thereafter making the determination from their SEQ# upon performing recovery processing.

The method of the storage system 200 managing the RPID by providing a prefix thereto is explained with reference to FIG. 12A-12C.

The host 100 designates the RPID 901 to be managed by the host 100, and issues a recovery point creation request to the storage system 200. Here, to avoid conflicting with the RPID of the recovery point to be created by the storage system 200 without instructions from the host, a prefix is added to the RPID 1201 of the recovery point to be created without instructions from the host.

The storage system 200, for example, manages the recovery points based on two tables; namely, a table 1200 shown in FIG. 12A and a table 1210 shown in FIG. 12B. The table 1200 shown in FIG. 12A is equivalent to the recovery point management table 242 managed by the storage system as shown in FIG. 8, and manages the recovery points created based on instructions from the host 100. And, based on the table 1210 shown in FIG. 12B, the storage system 200 manages the recovery points created without any instruction from the host 100. The RPID 1201 in the table 1210 is differentiated from the RPID 801 in the table 1200 by adding "S" before the number. This differentiation does not have be the addition of "S", and may also be realized by sorting the numbers to be allotted between the table 1200 and table 1210 in advance.

The table shown in FIG. 12B, as illustrated in FIG. 11, has an acquired time 1101, a volume number 1102, and an event 1103 as its attributes.

Moreover, there is also a method of managing the recovery points based on the table 1220 shown in FIG. 12C. The table 1220 shown in FIG. 12C is a result of the RPID 1201 merging the table 1200 shown in FIG. 12A and the table 1210 shown in FIG. 12B. The table 1200 shown in FIG. 12A does not have acquired time 1101, volume number 1102, and event attribute 1103, but such information may be created when the storage system 200 receives a recovery point creation request from the host 100.

Incidentally, when the host 100 collects from the storage system 200 the recovery points created by the storage system 200 without any instruction from the host 100, the host 100 may also newly allot the RPID 901 to the recovery points. In this case, the host 100 notifies that the RPID 901 has been newly allotted to the storage system 200, and the recovery point management table 242 of the storage system 200 will also be able to correct the RPID 801.

In the following processing steps described below, as shown in FIG. 11, the explanation is based on a method where the storage system 200 manages all RPIDs 801.

Next, the method of the storage system 200 detecting an event in the second case of the storage system 200 creating a recovery point without any instruction from the host 100 is explained with reference to FIG. 13 to FIG. 16. Since the detection of an event will differ depending on the type of event, the following explains the event detection method based on four patterns; namely, write failure due to a volume failure, before and after the execution of a command received from the host, change in configuration of the storage system 200, and polling by the status monitoring program. Nevertheless, the present invention is not limited to the following event detection methods and events.

Figure 13:
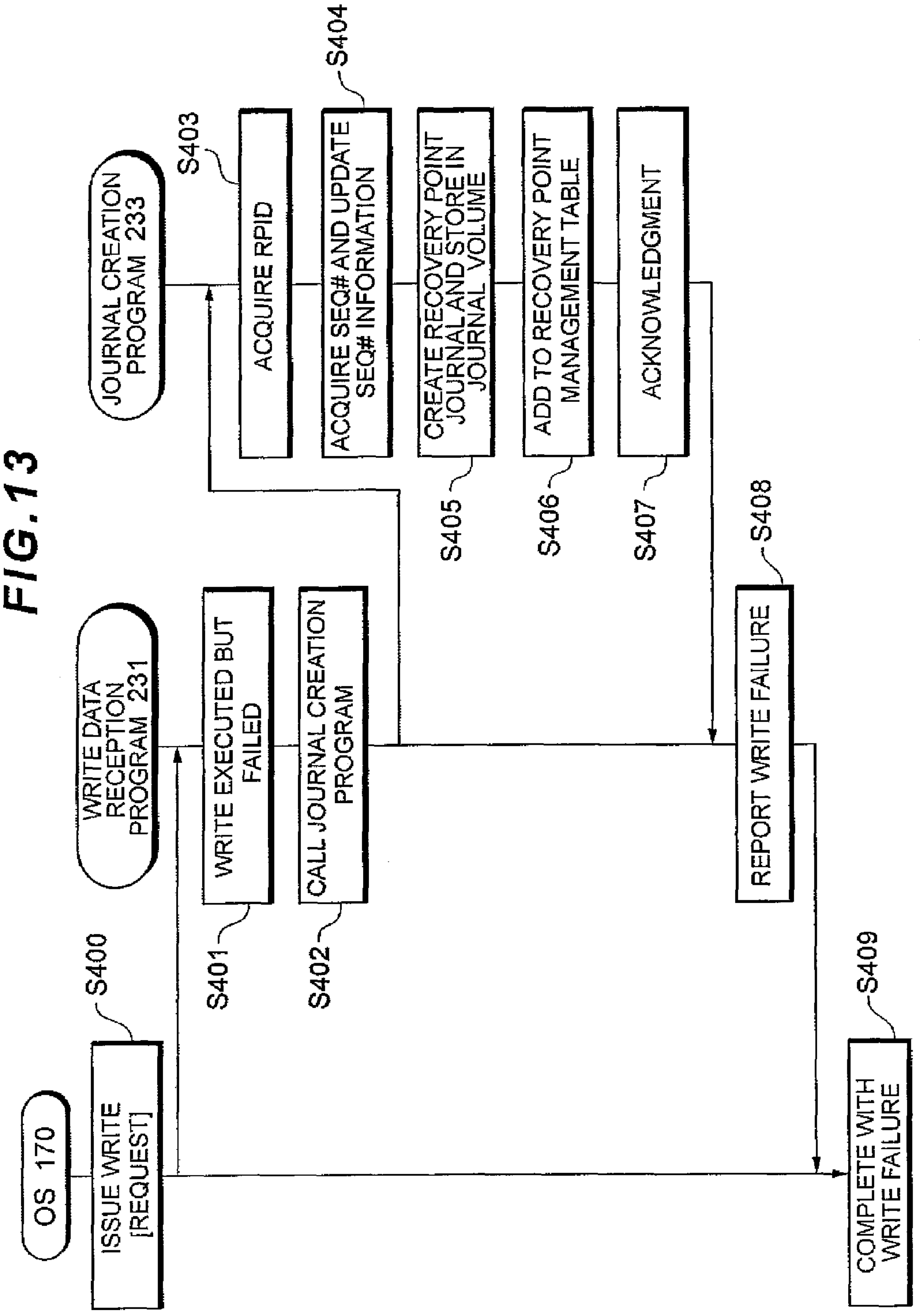
FIG. 13 is a diagram showing an example of recovery point creation processing based on an event detected by the storage system.

As the first pattern, FIG. 13 shows an example of the processing where the write data reception program 231 detects an event of failure in the volume 280 upon writing the write data received from the host 100 in the volume 280, and creates a recovery point. This processing is realized by the processor of the storage system 200 that received a signal from a program such as the OS 170 which issues a write request in the host 100 executing the write data reception program 231 and journal creation program 233.

The OS 170 of the host 100 issues a write request to the storage system 200 (S400). The write data reception program 231 of the storage system 200 detects a failure in the volume 280 due to write failure or the like upon writing the write data in the volume 280 (S401). The write data reception program 231 calls the journal creation program 233 for creating a recovery point journal (S402).

The called journal creation program 233 acquires the RPID 801 to be allotted to the created recovery point from the RPID information 244. Next, as with step S103, the journal creation program 233 acquires the SEQ#802, and updates the SEQ# information 243 for the creation of subsequent journals (S404). Next, the journal creation program 233 creates a recovery point journal containing the acquired SEQ#802, and stores this in the journal volume (S405). Finally, the journal creation program 233 adds the recovery point information to the recovery point management table 242 (S406), and notifies an acknowledgment to the write data reception program 231 (S407). The write data reception program 231 that received the acknowledgment reports the write failure to the host 100 (S408).

Figure 14:
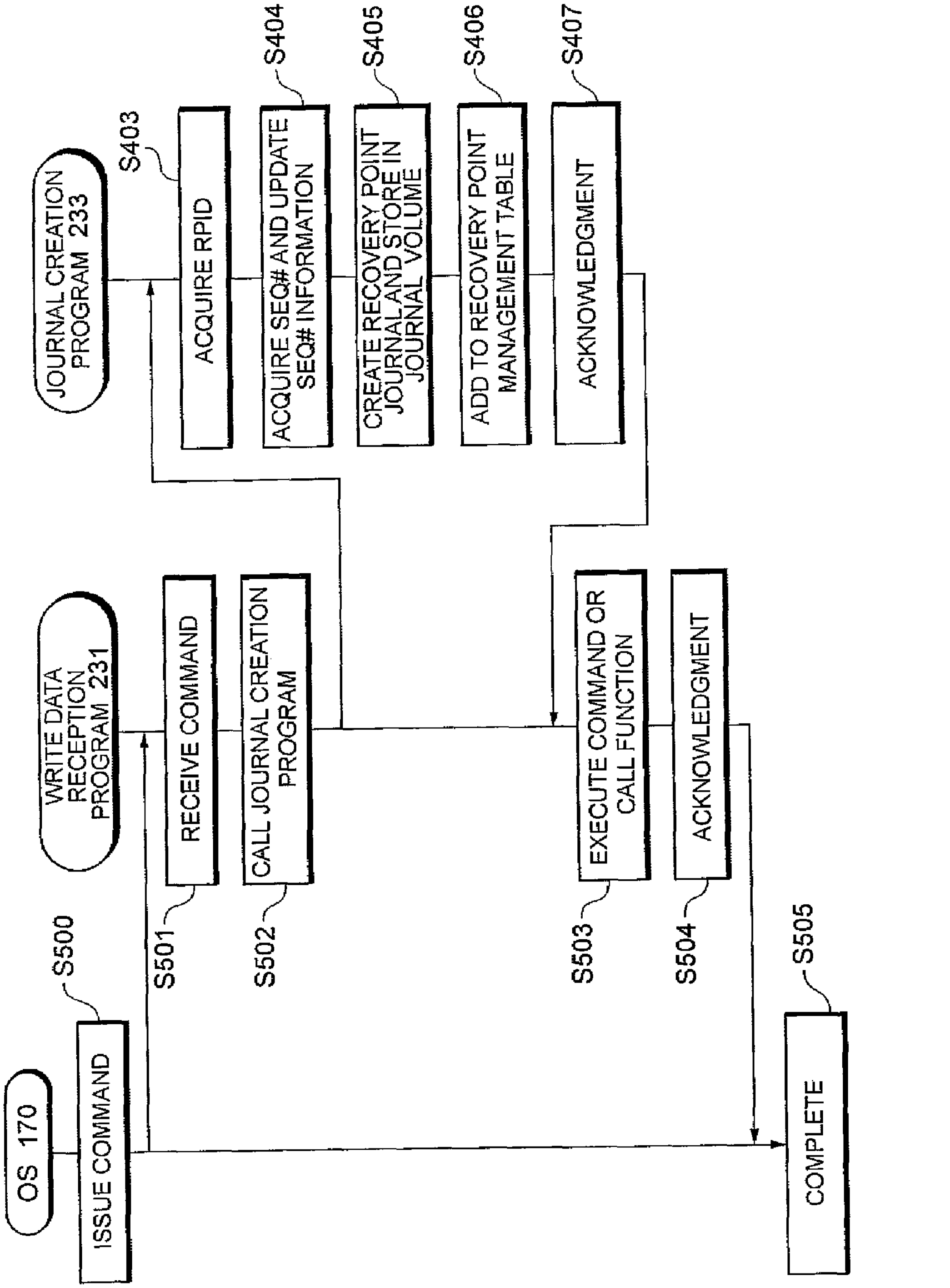
FIG. 14 is a diagram showing another example of recovery point creation processing based on an event detected by the storage system.

As the second pattern, FIG. 14 shows an example of the processing of the write data reception program 231 creating a recovery point before the execution of a command with the reception of such command from the host 100 as the opportunity of creating the recovery point. Since this example involves similar operations as with pattern 1 described above, only the different portions are explained.

The OS 170 of the host 100 issues a command to the storage system 200 (S500). When the write data reception program 231 of the storage system 200 receives the command (S501), it calls the journal creation program 233 (S502) for creating a recovery point. The recovery point creation processing by the journal creation program 233 (S403 to S407) is the same as the first pattern described above. After receiving the acknowledgment of recovery point creation from the journal creation program 233, the write data reception program 231 executes the command by calling a function after the creation of the recovery point (S503). Finally, the write data reception program 231 notifies the acknowledgment to the host 100 (S504).

In this second pattern, processing for selecting a command at S501 such as creating a recovery point only for a specific command may be performed. For instance, upon receiving a command for completely deleting the contents of the volume 280, this command is executed after creating a recovery point. By using the reception of such a command as an opportunity, even if the command was an operational error by the user, it is possible to recover data of the volume 280 immediately before the execution of such command.

Figure 15:
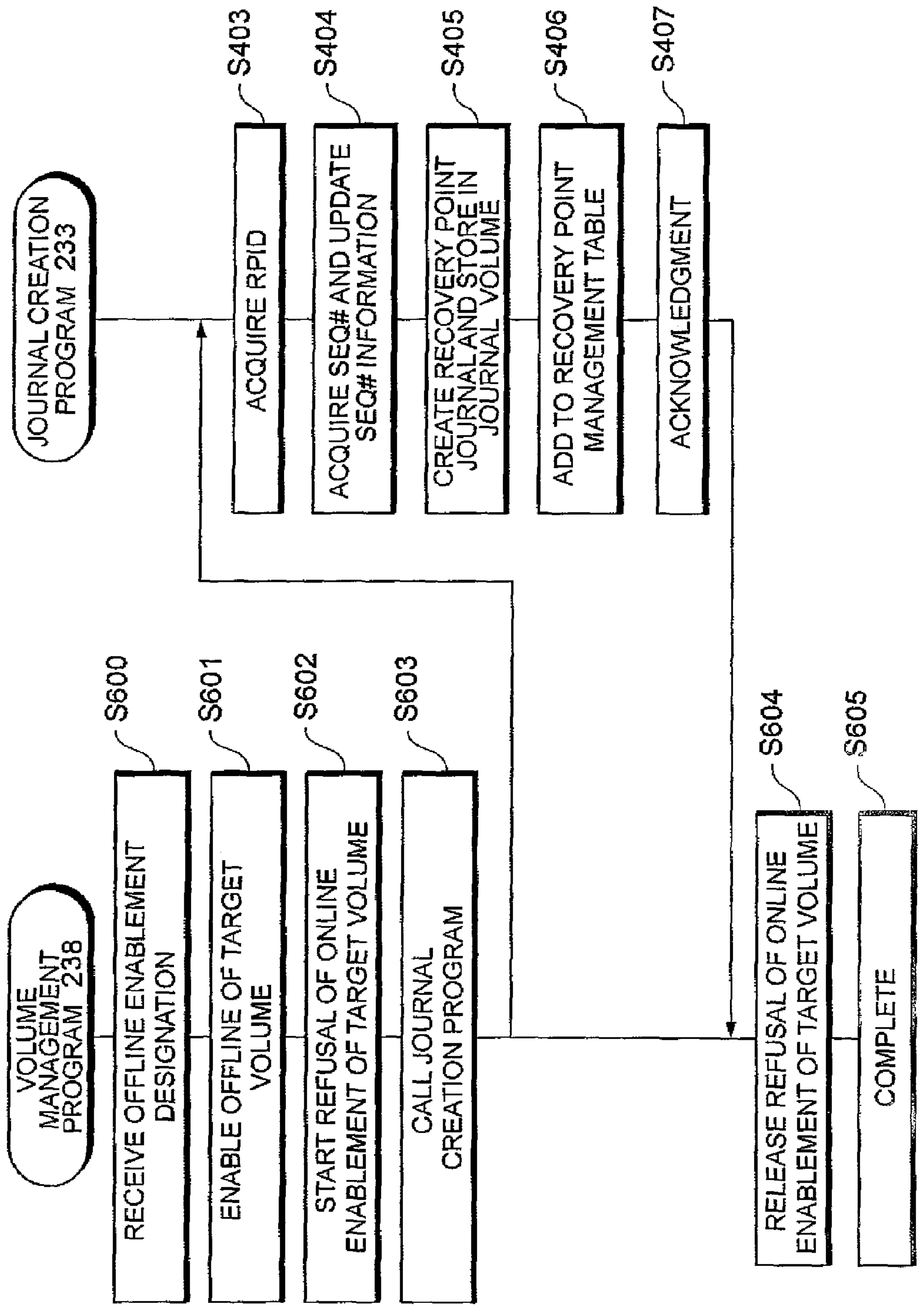
FIG. 15 is a diagram showing another example of recovery point creation processing based on an event detected by the storage system.

As the third pattern, FIG. 15 shows an example of the processing for the volume management program 238 to create a recovery point during offline processing based on the reception of an offline enablement command from an operation panel or maintenance management terminal. This processing is realized by the processor 250 of the storage system 200 executing the volume management program 238 and journal creation program 233.

The volume management program 238 receives an offline enablement command of the volume 280 via the operation panel or maintenance management terminal of the storage system 200 (S600). Next, the volume management program 238 turns the offline target volume 280 offline (S601). At this point in time, the host 100 is not able to issue a write request to the offline target volume 280. Then, the volume management program 238 starts refusing online enablement commands so that the target volume 280 will not go online until the creation of the recovery point is completed (S602). Next, the volume management program 238 calls the journal creation program 233 (S603). The recovery point creation processing by the journal creation program 233 (S403 to S407) is the same as the first pattern described above. After the creation of the recovery point is complete, the volume management program 238 releases the refusal of online enablement commands of the target volume 280 started at S602 (S604), and ends the processing (S605).

With this third pattern, when changing the configuration of the storage system 200 in offline processing from an operational panel or maintenance management terminal incidental to the storage system 200, it is possible to create a recovery point without the instruction from the host 100 being the opportunity of such creation. Like this, by using offline enablement as the opportunity, even when the host 100 is subsequently connected online and an error occurs because of the configuration change of the storage system, it is possible to recover data of the volume 280 before the configuration change of storage system 200.

Figure 16:
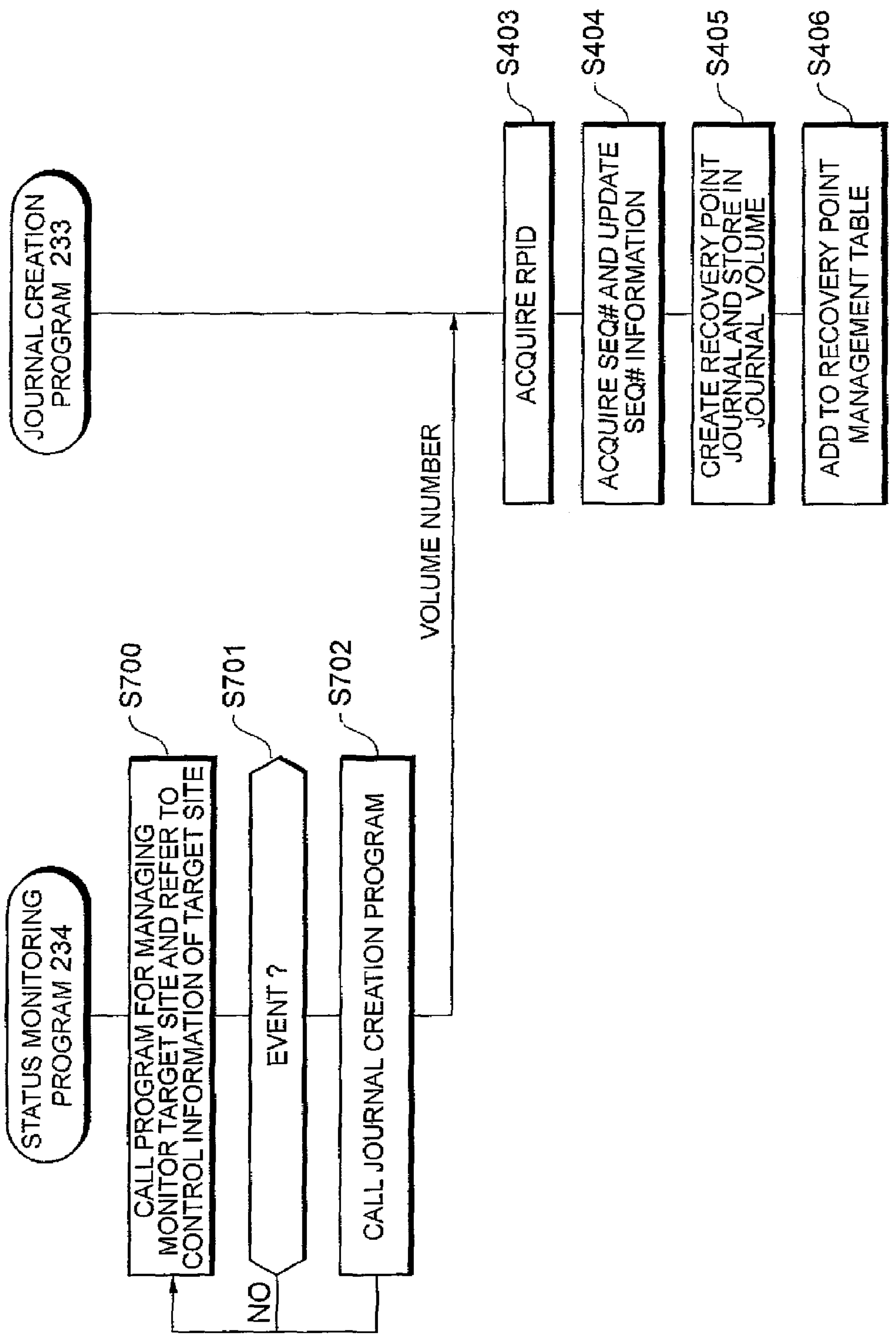
FIG. 16 is a diagram showing another example of recovery point creation processing based on an event detected by the storage system.

As the fourth pattern, FIG. 16 shows an example of the processing for creating a recovery point with the detection of an event in the storage system 200 by polling as the opportunity. This processing is realized by the processor 250 of the storage system 200 executing the status monitoring program 234 and journal creation program 233.

The status monitoring program 234, through polling and at an arbitrary opportunity, executes the calling of programs managing the monitor target unit and referral of management information of the unit to be monitored (S700). As a result, it is possible to check to whether any event (an event will differ depending on the portion; examples of an event will be described later) (S701). When the status monitoring program 234 determines that an event has occurred, it calls the journal creation program 233. Here, as parameter, the identifying information of the volume 280 is delivered to the journal creation program 233 (S702). The recovery point creation processing by the journal creation program 233 (S403 to S406) is the same as the first pattern described above. Further, when there is no occurrence of an event, or after the journal creation program 233 is called, the status monitoring program 234 returns once again to S700 and monitors the storage system 200.

According to the foregoing method, it is possible to realize the creation of a recovery point based on an event detected by the storage system 200. Incidentally, the following are examples of an event. The present invention, however, is not limited the following events.

As examples of an event to be detected at S701, when the monitor target unit is a power source unit, power supply stop, power supply start, power failure and battery operation start due to power failure of the storage system 200 can be considered.

Further, the monitoring target is a storage area, as example of an event to be detected at S701, attribute change of the volume 280 (including volume offline enablement and pair status transition of replication function) and failure detection (including failure on one side in a redundant system) that may be detected with the status monitoring program 234 can be considered.

Further, when the monitor target site is an interface unit, as examples of an event to be detected at S701, when a command from the host 100 or a write request or read request from the host is not issued for a predetermined length of time, or when a recovery point creation command from the host 100 is not issued for a predetermined length of time which may be detected with the write data reception program 231 can be considered.

Further, if the monitor target unit is the processor 250 itself, for example, an event such as the login/logout of iSCSI will be detected.

Incidentally, as a modified example of the fourth pattern, instead of polling described above, the processor 250 may collect and manage event logs each time any kind of event occurs in the respective monitor target units, determine whether it is a specific event, and create a recovery point with the detection of a specific event the opportunity.

In this case, the storage system 200 has event information 244 in the control information unit 240.

The event information 244 includes identifying information of a specific event as an event for creating a recovery point among all events collected from the management information of the respective monitor target units. The processor 250 refers to the event information 244 and determines whether all events collected from the management information of the respective monitor target units are registered therein, and, when these are registered in the event information 244, it detects that a specific event has occurred and calls the journal creation program 233. The journal creation program 233 creates a recovery point. The processing for the journal creation program 233 to create a recovery point is the same as the first pattern.

Further, each monitor target unit may has a processor, record the event history in the memory each time an event occurs in the monitor target. The processor 250 may read the event history and contents of the event information 244 and determines whether it is a specific event.

Further, when each monitor target unit has processor, read the contents of the event information 244 and determines whether it is a specific event each time an event occurs in the monitor target site. The processor may notify the processor 250 detection of the specific event.

Incidentally, the administrator is able to add or delete an event registered in the event information 244 via the management software 180, the maintenance management terminal or incidental operation panel of the storage system 200.

Further, as described above, while the storage system 200 is in operation, instead of constantly detecting an event, the administrator may stop or activate the event detection function via the management software 180, the maintenance management terminal or incidental operation panel of the storage system 200.

Next, the processing for providing a recovery point created by the storage system based on the foregoing event detection method to the host 100 in the second case where the storage system 200 creates a recovery point without any instruction from the host 100 is explained with reference to FIG. 17.

Figure 17:
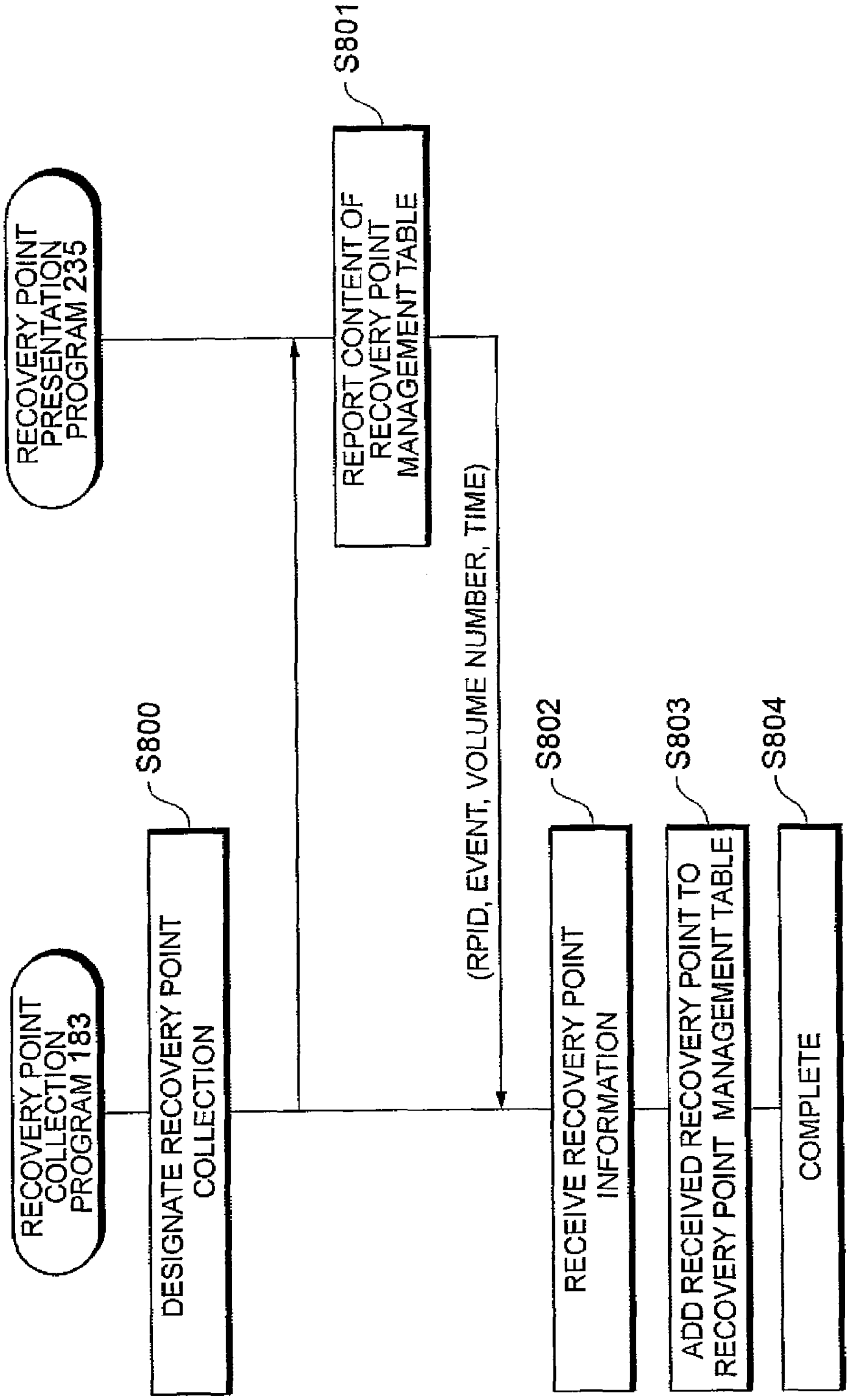
FIG. 17 is a diagram showing an example of processing for the host to collect a recovery point from the storage system.

FIG. 17 shows an example of the processing for the host 100 to collect recovery points based an event detected by the storage system 200. This processing is realized by the processor 120 of the host 100 executing the recovery point collection program 183, and the processor 250 of the storage system 200 executing the recovery point presentation program 235.

The recovery point collection program 183 issues a recovery point collection request to the recovery point presentation program 235 (S800). The recovery point presentation program 235 that received the recovery point collection request reads recovery point information from the recovery point management table 242 of the storage system 200, and reports this to the recovery point collection program 183. As the contents of recovery point information, as shown in FIG. 11, there are RPID 801, acquired time 1101, volume number 1102, event 1103 and soon (S801). When the recovery point collection program 183 receives recovery point information (S802), recovery point information is added to the recovery point management table 186 of the host 100. Here, RPID 901, acquired time 902, volume number 903 and event 905 as recovery point information will be values reported by the storage system 200, and type 904 is added a "storage system" to the recovery point management table 186 of the host 100 (S803).

Further, when recovery points created based on instructions from the host 100 and recovery points created without any instruction from the host 100 are managed by the same recovery point management table 242, only the recovery points created without any instruction from the host may be reported. Further, all recovery points stored in the recovery point management table 242 may be reported to the host 100, and the host 100 may add only the recovery points not based on instructions from the host to the recovery point management table 186 of the host 100.

Incidentally, for each recovery point collection from the host 100, the storage system 200 is able to simultaneously report a plurality of recovery points. Moreover, the host 100 may instruct the collection of recovery points designated by the event, and the storage system 200 may detect the designated event from the event 1103, and report only the recovery point based on such event. Further, the host 100 may designate a time and instruct the collection of recovery points, and the storage system 200 may report only the recovery points in which the acquisition time 1101 is newer than the designated time.

Here, in particular, in the second case when the storage system 200 creates a recovery point without any instruction from the host 100, it is possible that the total number of recovery points created by the storage system 200 will become enormous. Thus, the method of deleting recovery points as necessary is explained with reference to FIG. 18 and FIG. 19.

A plurality of policies can be considered for the processing method of deleting recovery points. For example, deleting only designated recovery points, designating an event and deleting all recovery points relating to the designated event, designating a time and deleting all recovery points before such designated time, and automatic deletion by the storage system 200 can be considered. Each of these is described below.

Foremost, the case of deleting only designated recovery points is explained.

The recovery point deletion designation program 184 of the host 100 designates the RPID 901, and issues a recovery point deletion request to the recovery point deletion program 236 of the storage system 200. The recovery point deletion program 236 that received the recovery point deletion request deletes recovery point information of the corresponding RPID 801 from the recovery point management table 242 of the storage system 200, and reports this to the recovery point deletion designation program 184. Finally, the recovery point deletion designation program 184 deletes the recovery point information of the designated RPID 901 from the recovery point management table 186 of the host 100.

Secondly, a case of the host 100 designating an event and deleting all recovery points relating to such designated event is explained.

The host 100 designates an event and issues a recovery point deletion designation, and the storage system 200 deletes all corresponding recovery points. Incidentally, as a modified example of this processing method, a method may be considered where subsequent recovery points are not created in relation to events designated by the host 100 for deleting the recovery points. Thereby, when software running on the host 100 determines that it is not necessary to create a recovery point based on a certain event, recovery points based on such event are not created.

Figure 18:
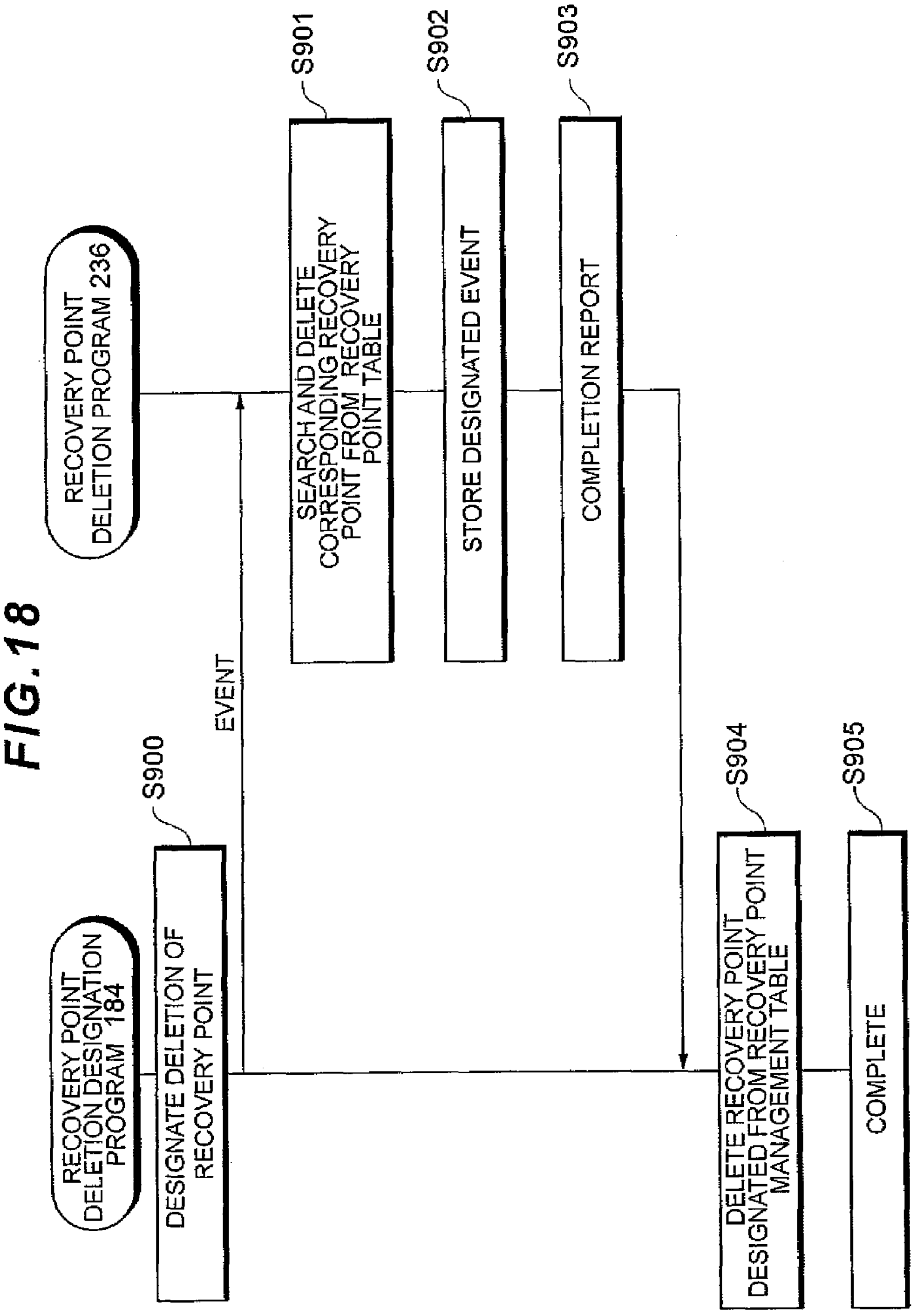
FIG. 18 is a diagram showing an example of processing for deleting a recovery point acquired by the storage system.

FIG. 18 shows an example of the recovery point deletion processing in the case of not creating subsequent recovery points regarding events designated by the host 100. This processing is realized by the processor 120 of the host 100 executing the recovery point deletion designation program 184, and the processor 250 of the storage system 200 executing the recovery point deletion program 236.

Foremost, the recovery point deletion designation program 184 designates a certain event 905, and issues a recovery point deletion request to the recovery point deletion program 236 of the storage system 200 (S900). The recovery point deletion program 236 that received the recovery point deletion request finds a recovery point based on the event 1103 corresponding to the designated event 905 and deletes it from the recovery point management table 242 of the storage system 200 (S901). Here, the recovery point deletion program 236 records the designated event 1103. As the storage area, although not shown, the control information unit 240 of the storage system 200 or the volume 280 is used (S902). Thereafter, the recovery point deletion program 236 notifies the acknowledgment to the recovery point deletion designation program 184, and ends the processing (S903). Finally, the recovery point deletion designation program 184 deletes a recovery point based on the event 905 from the recovery point management table 186 of the host 100 (S904).

The inhibition of creating recovery points based events recorded at step S902 is now explained. Above, four patterns of the event detection method and recovery point creation processing method have been described in FIG. 13, FIG. 14, FIG. 15, FIG. 16. In these processes, there are processing steps for calling the journal creation program 233 for creating a recovery point journal (S402, S502, S603, S702). Immediately before calling this journal creation program 233, a step of checking whether the recovery point journal to be created now corresponds to the event 1103 recorded at S902. At this step, if the recovery point journal corresponds to an event 1103 recorded at S902, it is possible to inhibit the creation of recovery points by not calling to the journal creation program 233.

Thirdly, a case of the host 100 designating a time and deleting all recovery points before such designated time is explained.

The host 100 designates a time and issues a recovery point deletion request. And, storage system 200 deletes all recovery points created by the storage system 200 before the designated time. Incidentally, as a modified example of this processing method, a journal up to the recovery point after the designated time may be applied to the snapshot created before the designated time, and delete the snapshots and journals before the designated time. A conceptual diagram of this modified example is shown in FIG. 19.

Figure 19:
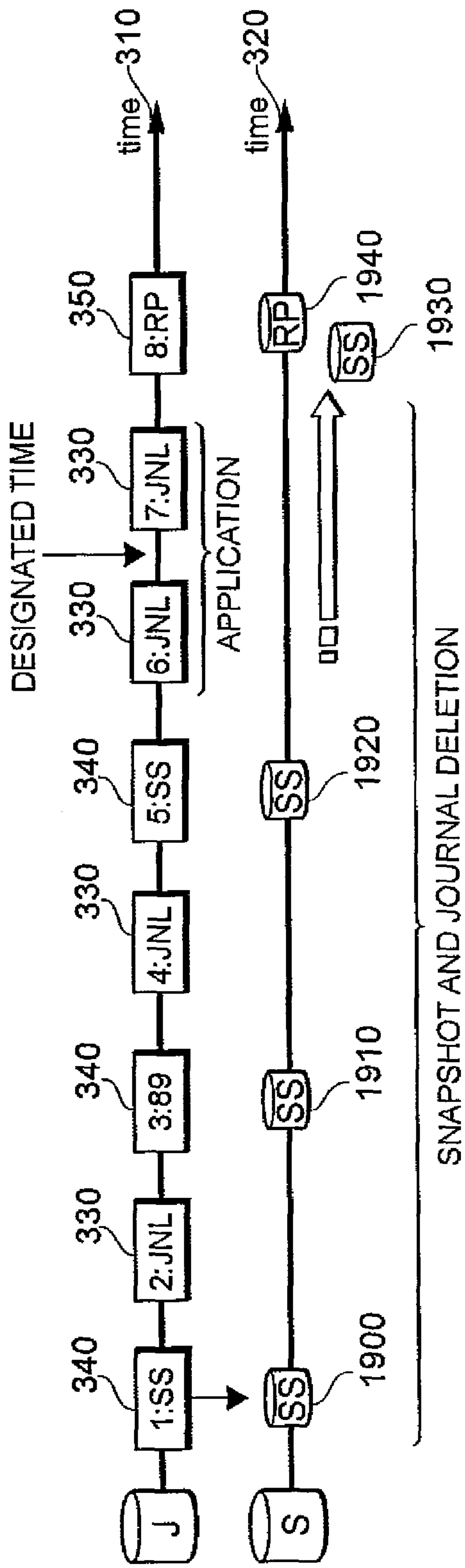
FIG. 19 is a diagram showing a concept of deleting the unnecessary snapshot and journal pursuant to the deletion of a recovery point.

In the example of FIG. 19, the designated time of the host 100 is a time between SEQ#6 and SEQ#7 of the journal. This comparison is realized by comparing the designated time of the host 100 and the time 502, which is attribute information of the journal shown in FIG. 5.

A snapshot before the designated time is the snapshot shown in the volume 1920. And, a recovery point after the designated time is the recovery point shown in the volume 1940 corresponding to the recovery point journal of SEQ#8. Here, the snapshot at the point of the volume 1940 is created by applying the journal of SEQ#6 and SEQ 7 to the snapshot of the volume 1920. The created snapshot is shown in the volume 1930 of FIG. 19. As a result, recovery to the recovery point (volume 1940) after the designated time can be realized with the snapshot 1930. Further, when the storage system 200 receives a request from the host 100 to delete the recovery points after the designated time, the snapshots and journals of SEQ#1 to SEQ#7 shown in the volumes 1900, 1910 will no longer be required, and can therefore be deleted.

The recovery point deletion processing is explained below. The recovery point deletion designation program 184 designates a certain time and issues a recovery point deletion request to the recovery point deletion program 236 of the storage system 200. The recovery point deletion program 236 that received the recovery point deletion request searches snapshot before the designated time from the snapshot management table 241. When snapshot before the designated time do not exist, the recovery point deletion program 236 notifies the acknowledgment to the host 100 and ends the processing.

When there are snapshots before the designated time, next, recovery points after the designated time are searched from the recovery point management table 242. When there are recovery points after the designated time, the recovery point deletion program 236 notifies the acknowledgment to the host 100 and ends the processing.

When there are snapshots before the designated time and there are recovery points after the designated time, journals up to the recovery points after the designated time are applied to the snapshots before the designated time. Thereby, snapshots corresponding to the recovery points after the designated time are created (here, the snapshot management table 241 is also updated). Finally, the recovery point deletion program 236 deletes the data of snapshots and journals before the snapshots corresponding to the recovery points created in the previous step, and notifies the acknowledgment to the host 100. The host 100 that received the acknowledgment updates the recovery point management table 186 and ends the processing.

Fourth, the automatic deletion by the storage system 200 is explained.

For example, the storage system 200 is able to automatically delete the recovery points after the lapse of a certain period of time. This processing is explained below. The recovery point deletion program 236 of the storage system 200 searches for recovery points that are older than a predetermined period (for instance, 1 year) from the recovery point management table 242. Next, the recovery point deletion program 236 deletes such recovery points. Thereafter, upon receiving the recovery point collection request from the recovery point collection program 183 of the host 100, by notifying the information on the recovery points automatically deleted, these are also deleted from the recovery point management table 186 of the host 100. Further, modified examples of event designation and time designation for deleting the recovery points can also be applied to the automatic deletion of the storage system 200.

Next, an example of a user interface of this embodiment is explained with reference to FIG. 20. The management software 180 presents the recovery point to users with a GUI (Graphical User Interface) screen. Further, the user may select the recovery point from the GUI screen and issue a recovery request or recovery point deletion request. The GUI screen is executed by the GUI program 188 of the management software 180.

FIG. 20 shows an example of the GUI screen provided by the management software 180 to the user. The GUI screen 2000 is broadly configured from a recovery point display unit 2010, a recovery designation unit 2020, and a recovery point deletion unit 2030.

The recovery point display unit 2010 displays a recovery point according to the recovery point list 2011. The recovery point list 2011 has, as its attributes, RPID 2012, acquired time 2013, volume number 2014, type 2015, and event content 2016. The display of each attribute is in the form of a pull-down menu. For example, in the type 2015, when a menu is clicked, as shown in the screen 2018, "All", "User designation", "Host automatic acquisition", "Storage system automatic acquisition" are displayed. Here, when "storage system automatic acquisition" is selected, the recovery point list 2011 displays a recovery point with the event detection of the storage system 200 as its opportunity.

The user is able to select one recovery point from the recovery point list 2011. In the example shown in FIG. 20, the recovery point information 2017 of RPID4 is selected.

The recovery designation unit 2020 is configured from a recovery destination volume list 2021 and a recovery request button 2023. When the user selects one recovery point from the recovery point list 2011, and further selects one recovery destination volume from the recovery destination volume list 2021, it is possible to issue a recovery request to the storage system 200 by clicking the recovery request button 2023. In the example of FIG. 20, the entry 2022 as the volume 4 is selected in the recovery destination volume.

The recovery point deletion unit 2030 is configured from a recovery point deletion button 2031. When the user selects one or more recovery points to be deleted from the recovery point list 2011 and executes the recovery point deletion button 2031, it is possible to issue a deletion request of the selected recovery point to the storage system 200.

Further, by selecting an item from the pulldown menu of the recovery point list 2011 and clicking the recovery point deletion button 2031, recovery point request of an event designation and recovery point request of an acquisition time designation can be operated. Specifically, for example, "communication failure" is selected from the event content 2016, and the recovery point deletion button 2031 is executed. Here, the storage system 200 that received the recovery point deletion request deletes all recovery points acquired based on the event of "communication failure".

Incidentally, in the present embodiment, as explained with reference to FIG. 4, when the storage system 200 receives a snapshot creation request, all data of the source volume 400 is copied to the snapshot volume. The present embodiment can also be realized by creating snapshots according the following modified examples 1 and 2.

Modified Example 1

In modified example 1, even if the storage system 200 receives a snapshot creation request, data copy from the source volume 400 to the snapshot volume 410 is not operated until data is written in the source volume 400.

When the storage system 200 receives a snapshot creation request, as attributes of the snapshot volume 410, a pointer to the same address to the source volume 400 per address of the snapshot volume 410 is created. When reading data from the snapshot volume 410, the storage system 200 uses this pointer and controls the reading of data from the source volume 400. When a write request is issued from the host 100 to the source volume 400, the data stored in the write address is copied to the snapshot volume 410, and, after the completion of such copying, write data from the host 100 is written in the source volume 400. Moreover, with respect to this address, the pointer from the snapshot volume 410 to the source volume 400 is deleted.

As a result of the foregoing processing, the read request for reading data in the snapshot volume 410 corresponding to the address to which a write request was issued in the source volume 400 will be performed to the snapshot volume 410, and not the source volume 400.

Modified Example 2

In modified example 2, in addition to modified example 1, a storage area is allocated when actually writing data in the snapshot volume 410. For example, this is realized as follows.

A storage area to be allocated to a plurality of snapshots is created as necessary in the storage system 200. This storage area is referred to as a pool volume (not shown).

When a write request is issued from the host 100 to the source volume 400, the storage system 200 allocates an area of a required capacity from the pool volume to the snapshot volume 410. Next, data stored in the write address of the source volume 400 is copied to the area allocated in the snapshot volume 410, and, after the completion of such copying, write data from the host 100 is written in the source volume 400. In this case, the snapshot volume 410 will become a pointer to the source volume 400 or pool volume.

The present invention can also be implemented with a logically acquired snapshot as described above. By creating a snapshot volume 410 as described in modified example 1 and modified example 2, it is possible to reduce the storage area for the snapshot volume 410.

Incidentally, the present invention can also be implemented with snapshot creation technology not described in the present embodiment.

According to the first embodiment, in a system where a host is connected to a storage system, even with an event that is detected by the storage system but not detected by the host, by the storage system creating a recovery point, it is possible to execute recovery thereafter. Further, by arbitrarily deleting the created recovery point, it is possible to reduce the capacity required for the recovery point stored in the storage area.

Second Embodiment

Figure 21:
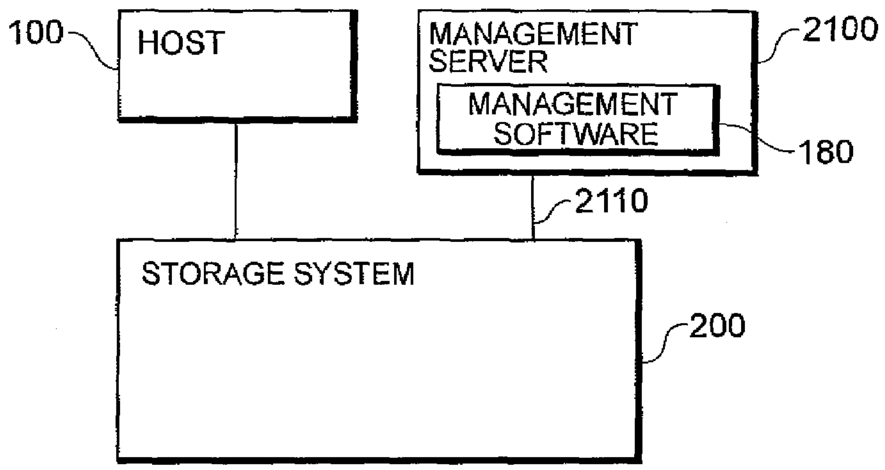
FIG. 21 is a diagram showing an example of an information processing system in the second embodiment.

In the first embodiment, the present invention was explained with the system configuration shown in FIG. 1 and FIG. 2. Nevertheless, the present invention can be implemented with a configuration other than the system configuration shown in FIG. 1 and FIG. 2. FIG. 21 shows an example of another system configuration as the second embodiment. In this configuration, the host 100 and management server 2100 are connected to the storage system 200 via a network. Connection of the host 100 and storage system 200 is conducted via the network 160 as shown in FIG. 1 and FIG. 2. The management server 400 and storage system 200 are connected via a management network 2110.

The management server 2100 has management software 180. The management software 180 is the same as the management software 180 shown in FIG. 1 and FIG. 2. The management server 2100 implements the configuration of backup/recovery with this management software 180. Further, in addition to the system configuration of FIG. 21, the host 100 and management server 2100 may also be connected via a network.

As a result of adopting the system configuration of the second embodiment, it is possible to reduce the network load in the communication between the host 100 and storage system 200. Further, it is also possible to prevent the degradation in the I/O processing performance of the processor 120 of the host 100.

Third Embodiment

Figure 22:
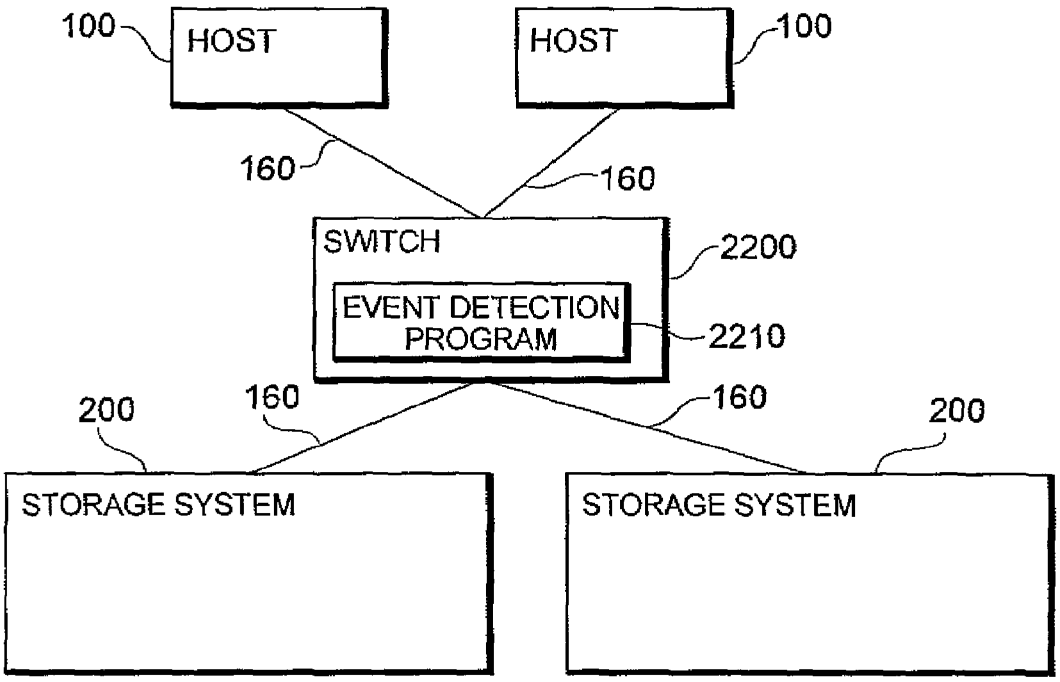
FIG. 22 is a diagram showing an example of an information processing system in the third embodiment.

The present invention can also be applied with the system configuration shown in FIG. 22. FIG. 22 shows an example of another system configuration as the third embodiment. In this configuration, the storage system 200 and host 100 are connected with the network via a switch 2200. This switch 2200 has an event detection program 2210. And, the event detection program 2210 issues a recovery point creation command to the storage system 200 based on the detection of an event that is detectable with the switch 2200. The storage system that received the command creates the recovery point. Further, the switch 2200 may also perform the recovery point creation processing. Further, another device connected to the switch 2200 with a processor or memory, and this device may have the event detection program 2210. Further, this device may create and store journals.

As a result of performing event detection with the switch 2200 connected to a plurality of storage systems 200 and hosts 100 as in the system configuration of this embodiment, even when a plurality of storage systems 200 are linked and operated, it is possible to detect such linked operation as an event.

For example, when data is to be migrated from the storage system A connected to the switch 2200 to the storage system B, the completion of migration could be detected as an event. Further, when the storage system A and storage system B are respectively and operation system and standby system, the switch 2200 may detect the switching from the storage system A to the storage system B as an event.

Fourth Embodiment

The fourth embodiment is explained with reference to FIG. 23.

In this embodiment, a method of creating a recovery point to certain volume 280 or an aggregate of volumes 280 in the first embodiment based on an event that was occurred and detected in a storage system separate from the storage system to which the volume 280 belongs.

In the field of storage systems, there is a remote copy function as the function to continue providing service as a storage system without losing the data stored in the storage system even if the data center collapses due to disaster.

A remote copy function is a function of copying and replicating data stored in a volume 280 of a storage system (hereinafter referred to as a "primary storage system" in this embodiment) to another storage system (hereinafter referred to as a "secondary storage system" in this embodiment). Under this kind of environment, two volumes 280 and storage systems will be associated. Thus, for instance, due to a failure in the secondary storage system, data in the primary storage system cannot be replicated.

In the present embodiment, a method for creating a recovery point in the primary storage system based on an event detected in the secondary storage system is explained.

Figure 23:
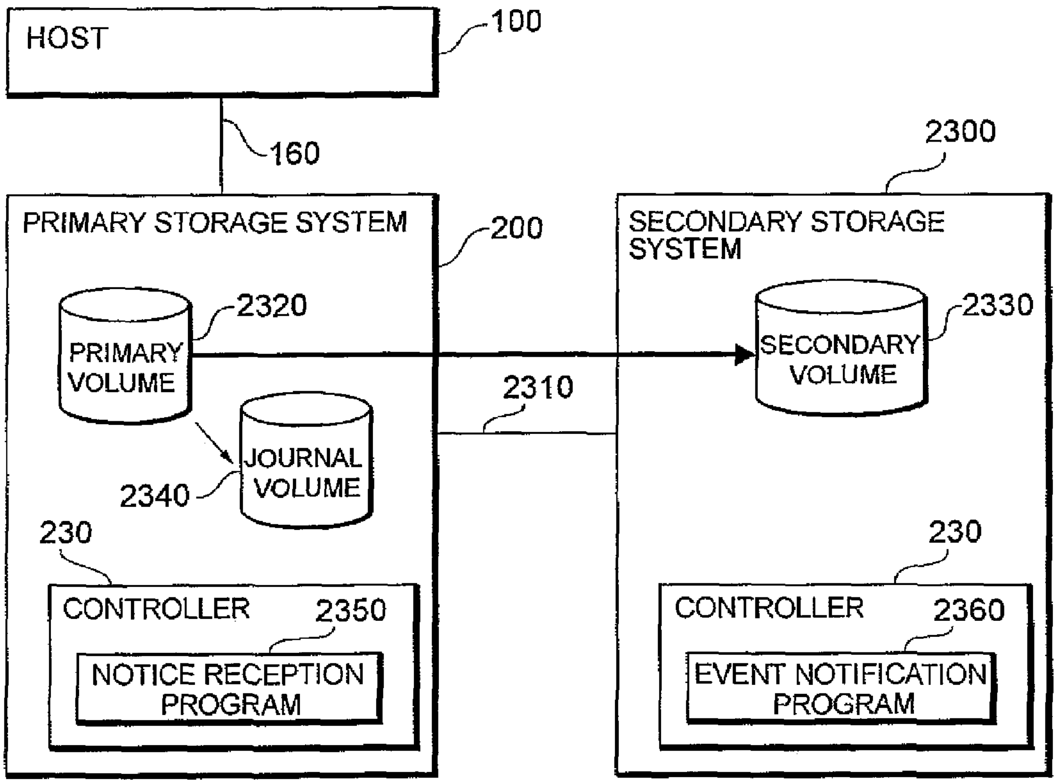
FIG. 23 is a diagram showing an information processing system in the fourth embodiment.

FIG. 23 shows an example of the overall configuration of the system pertaining to the present embodiment. In addition to the system configuration shown in FIG. 1, FIG. 2 of the first embodiment, a secondary storage system 2300 is connected to the storage system 200 via a network 2310. Incidentally, the storage system 200 is the primary storage system 200 in this embodiment.

The primary storage system 200 has a primary volume 2320 as the copy source volume 280 of the remote copy. Journals of the primary volume 2320, as with the first embodiment, are stored in the journal volume 2340. Moreover, the primary storage system 200 has a notice reception program 2350 for receiving a notice of event occurrence from the secondary storage system 2300 in the controller 230. The other configurations are the same as the storage system 200 explained in the first embodiment.

The secondary storage system 2300 has a secondary volume 2330 which is the copy destination volume 280 of the remote copy. The secondary storage system 2300 receives the data stored from the primary storage system 200 to the primary volume 2320 synchronously or asynchronously based on remote copy and stores this in the secondary volume 2330. Moreover, the secondary storage system 2300 has in the controller 230 an event notification program 2360 for notifying the event detected by the secondary storage system 2300 to the primary storage system 200. The remaining configurations are the same as the storage system explained with reference to the first embodiment. Below, the method of the primary storage system 200 creating a recovery point based on an event detected with the secondary storage system 2300 is explained.

Foremost, the secondary storage system 2300, with the method explained in the first embodiment, detects an event that is detectable with the secondary storage system. The secondary storage system 2300 that detected the event executes the event notification program 2360, and notifies the primary storage system 200 of the occurrence of an event. The notice reception program 2350 that received the notice of event occurrence from the event notification program 2360 calls the journal creation program 233, and creates a recovery point (the recovery point creation processing with the journal creation program 233 is the same as the first embodiment). According to the foregoing processing, it is possible to create recovery points based on an event occurred in the secondary storage system 2300 with the primary storage system 200.

For example, it is possible to create a recovery point to the primary volume 2320 of the primary storage system 200 with the status transition (release of the pair relation or the like) of the secondary volume 2330 of the remote copy function of the secondary storage system 2300.

Incidentally, in the foregoing system configuration, the secondary storage system 2300 may have a journal volume and a notice reception program 2350, and the primary storage system 200 may have an event notification program 2360. In this case, the creation of a recovery point based on an event in the primary storage system 200 with the secondary storage system 2300 can also be realized with the foregoing method.

Fifth Embodiment

The fifth embodiment is explained with reference to FIG. 24.

In this embodiment, a method providing to the host 100 information that the data stored in the storage system 200 is likely corrupted when the storage system 200 detects an event of failure is explained.

In many storage systems 200, all hardware is made redundant, and a single point of failure will not corrupt the data stored in the storage system 200. Nevertheless, not all storage systems 200 are made redundant, and there are cases when a double failure will lead to data corruption or loss of data. By providing information to the host 100 in that data after a certain recovery point could be corrupted as in this embodiment enables the recovery of data at a point in time when the data has not yet been corrupted.

In order to realize the above, in addition to the information described in the first embodiment, information on the probability status of data corruption is also added to the recovery point management table 242 of the storage system 200 and the recovery point management table 186 of the host 100 in the first embodiment. FIG. 24 shows the recovery point management table 2400 of the storage system 200 having information on the probability status of data corruption. The other attributes of the recovery point management table 2400; namely, RPID 801, acquired time 1101, volume number 1102, SEQ#802 and event 1103 are the same as the first embodiment. The data corruption probability status information 2401 stores identifying information for showing the status of possibility of data corruption. Further, although not shown, the recovery point management table 186 of the host 100 also stores information having an attribute of the possibility of data corruption.

Foremost, the recovery point provision method to the user is explained.

In the first embodiment, let it be assumed that the storage system 200 detected an event of failure in a certain volume and that it created a recovery point after the occurrence of the event. Next, the storage system 200 receives a recovery point creation request to the certain volume from the host 100, creates a recovery point. Here, although this will also depend on the unit where the failure occurred, when the foregoing two recovery points were created as recovery points for the same volume, data of the recovery point created by the storage system 200 according to the recovery point creation request of the host 100 could be corrupted. But, information on possibility of data corruption is not provided to the host 100 and user. In this embodiment, in order to accurately provide information on the possibility of data corruption to the user in the foregoing case, when the storage system 200 detects a failure and creates a recovery point, it identifies the scope of failure and stores such information. Then, when the storage system 200 is to subsequently create a recovery point, the volume to be the target of recovery point creation is included in the scope of the stored failure, "YES" is added to the data corruption probability status information 2401 since there is a possibility of data corruption, and a recovery point is created thereby.

Specifically, for example, as shown in FIG. 24, a cache failure is detected, "YES" is stored in the data corruption probability status information 2401 since there is a possibility of data corruption and a recovery point in which the RPID is 13 is created to the volume 1. Since a cache failure also affects volumes other than volume 1, as the scope of failure, "YES" is stored in the data corruption probability status information 2401 since there is a possibility of data destruction in the recovery points of RPID 14 to RPID 18 to be created subsequently, and the recovery point is created thereby.

By providing a recovery point to the user like this, the user will be able to judge the recover to recovery points before RPID 12 is sufficient in order to recover data with no data corruption.

Further, in the foregoing explanation, although a case was explained where the probability status of data corruption to the recovery point to be created as decided when the storage system 200 detects a failure, judgment on whether to add the data corruption probability status information 2401 may also be made by the host 100. In other words, the storage system 200, as with the first embodiment, provides recovery point information to the host. Then, the host 100 decides the probability status of data corruption from the event content of the recovery points collected from the storage system 200.

Next, the recovery point deletion method is explained. This method is for preferentially deleting a recovery point with a possibility of data corruption. With the recovery point deletion method of the first embodiment, a method was explained where a recovery point is automatically deleted by the storage system 200.

In the present embodiment, as the recovery point to be deleted, a recovery point with possible data corruption can be preferentially selected based on the data corruption probability status information 2401. Further, it is also possible to automatically select a recovery point with possible data corruption from the host 100, and to request the deletion of such recovery point to the storage system 200.

Further, also provided may be an interface for allowing an administrator or the like to notify host 100 or storage system 200 the recovery of a failure unit via the management software 180, maintenance management terminal or operational panel. Here, the recovery points created from the recovery point with a failure as the event until the failure recovery is notified may be collectively deleted.

As described in this embodiment, as a result of the storage system 200 providing the data corruption probability status information 2401 each time an event occurs and notifying the host 100, the user will be able to execute recovery by selecting a highly reliable recovery point in which data is correctly stored. Further, the user will be able to select and delete a recovery point after the point in which the data may have been corrupted.

Although the embodiments of the present invention were described above, the present invention shall in no way be limited by these embodiments, and may obviously be implemented in various modes without deviating from the gist of the present invention.

What is claimed is:

1. A switch connected to a network system including a computer and a storage apparatus, the switch for controlling a read/write request from the computer to the storage apparatus and controlling to store journal data in the storage apparatus:

wherein the storage apparatus includes a first storage area for storing data to be used by the computer and a second storage area for storing first journal data including write data and information corresponding to the write data when there is a write request from the computer for writing data in the first storage area;

wherein when the switch is adapted to detect an event of status change related to the network system, mark a first point of time corresponding to the event as a recovery request point, and create second journal data including information corresponding to the recovery request point.

2. A switch according to claim 1, wherein the switch detects the event of status change by receiving the status change information of the storage apparatus from the storage apparatus.

3. A switch according to claim 1, wherein the network system further comprises a second storage apparatus, wherein the switch detects the event of status change in response to completion of migration of data from the storage apparatus to the second storage apparatus.

4. A switch according to claim 1, wherein the network system further comprises a second storage apparatus, wherein the switch detects the event of status change after switching an operation storage apparatus from the storage apparatus to the second storage apparatus.

5. A network system connected to a computer, comprising:

a storage apparatus including a plurality of storage areas; and a switch connected to the computer and the storage apparatus, the switch adapted to control a read/write request from the computer to the storage apparatus and adapted to store journal data in the storage apparatus;

wherein the storage apparatus includes a first storage area of the plurality of storage areas for storing data to be used by the computer, and a second storage area of the plurality of storage areas for storing first journal data including write data and information corresponding to the write data when there is a write request from the computer for writing data in the first storage area;

wherein the switch is adapted to detect an event of status change related to the network system, mark a first point of time corresponding to the event as a recovery request point, and create second journal data including information corresponding to the recovery request point.

6. A network system according to claim 5, wherein the switch detects the event of status change by receiving the status change information of the storage apparatus from the storage apparatus.

7. A network system according to claim 5, further comprising a second storage apparatus, wherein the switch detects the event of status change in response to completion of migration of data from the storage apparatus to the second storage apparatus.

8. A network system according to claim 5, further comprising a second storage apparatus as a standby storage apparatus, wherein the switch detects the event of status change after switching an operation storage apparatus from the storage apparatus to the second storage apparatus.

* * * * *